US010650437B2

(12) United States Patent
Tsao

(10) Patent No.: US 10,650,437 B2
(45) Date of Patent: May 12, 2020

(54) USER INTERFACE GENERATION FOR TRANSACTING GOODS

(71) Applicant: Accenture Global Services Limited, Dublin (IE)

(72) Inventor: Vivien Tsao, Palo Alto, CA (US)

(73) Assignee: Accenture Global Services Limited, Dublin (IE)

( * ) Notice: Subject to any disclaimer, the term of this patent is extended or adjusted under 35 U.S.C. 154(b) by 731 days.

(21) Appl. No.: 14/727,237

(22) Filed: Jun. 1, 2015

(65) Prior Publication Data

US 2016/0350838 A1     Dec. 1, 2016

(51) Int. Cl.
    *G06Q 30/00*        (2012.01)
    *G06Q 30/06*        (2012.01)

(52) U.S. Cl.
    CPC ..... *G06Q 30/0635* (2013.01); *G06Q 30/0641* (2013.01); *G06Q 30/0643* (2013.01)

(58) Field of Classification Search
    CPC ........... G06Q 30/0251; G06Q 30/0635; G06Q 30/0641; G06Q 30/06; G06Q 30/02; G06G 30/0635; G06G 30/0641; G06G 30/0643
See application file for complete search history.

(56) References Cited

U.S. PATENT DOCUMENTS

| | | |
|---|---|---|
| 5,991,739 A | 11/1999 | Cupps et al. |
| 6,195,691 B1 | 2/2001 | Brown |
| 6,401,085 B1 | 6/2002 | Gershman et al. |
| 6,519,571 B1 | 2/2003 | Guheen et al. |
| 6,526,449 B1 | 2/2003 | Philyaw et al. |

(Continued)

FOREIGN PATENT DOCUMENTS

| | | |
|---|---|---|
| EP | 2378480 | 3/2015 |
| WO | WO 2000073955 | 12/2000 |

(Continued)

OTHER PUBLICATIONS

International Search Report and Written Opinion in International Application No. PCT/IB2016/052333, dated Jul. 8, 2016, 13 pages.

(Continued)

*Primary Examiner* — William J Allen
*Assistant Examiner* — Maria S. P. Heath
(74) *Attorney, Agent, or Firm* — Fish & Richardson P.C.

(57) ABSTRACT

Methods, systems, and apparatus, including computer programs encoded on a computer storage medium, for user interface generation for transacting goods are disclosed. In one aspect, a method includes receiving order data, user data, and other data. The method further includes determining, for a particular user, an order confidence score that corresponds to a likelihood that the particular user ordered a particular good from a particular vendor on a particular day. The method further includes receiving vendor-type mapping data. The method further includes determining a good-type confidence score that corresponds to the likelihood that the particular good or the particular vendor is associated with a particular type of good. The method further includes determining a composite confidence score. The method further includes storing the composite confidence score, data identifying the particular user, data identifying the particular type of good, and data identifying the particular date.

21 Claims, 8 Drawing Sheets

(56) References Cited

U.S. PATENT DOCUMENTS

| | | |
|---|---|---|
| 6,535,880 B1 | 3/2003 | Musgrove et al. |
| 6,546,374 B1 | 4/2003 | Esposito et al. |
| 6,587,838 B1 | 7/2003 | Esposito et al. |
| 6,697,824 B1 | 2/2004 | Bowman-Amuah |
| 6,801,228 B2 | 10/2004 | Kargman |
| 6,845,361 B1 | 1/2005 | Dowling |
| 6,901,397 B1 | 5/2005 | Moldenhauer et al. |
| 6,903,723 B1 | 6/2005 | Forest |
| 6,920,431 B2 | 7/2005 | Showghi et al. |
| 6,922,567 B1 | 7/2005 | Rydbeck |
| 6,959,283 B1 | 10/2005 | White |
| 6,961,778 B2 | 11/2005 | Swartz et al. |
| 6,980,962 B1 | 12/2005 | Arganbright et al. |
| 7,003,500 B1 | 2/2006 | Driessen |
| 7,069,235 B1 | 6/2006 | Postelnik et al. |
| 7,072,856 B1 | 7/2006 | Nachom |
| 7,110,964 B2 | 9/2006 | Tengler et al. |
| 7,124,098 B2 | 10/2006 | Hopson et al. |
| 7,124,101 B1 | 10/2006 | Mikurak |
| 7,197,478 B2 | 3/2007 | Kargman |
| 7,200,614 B2 | 4/2007 | Reid et al. |
| 7,206,756 B1 | 4/2007 | Walsky |
| 7,233,655 B2 | 6/2007 | Gailey et al. |
| 7,270,267 B2 | 9/2007 | Yeung et al. |
| 7,287,002 B1 | 10/2007 | Asher et al. |
| 7,302,429 B1 | 11/2007 | Wanker et al. |
| 7,340,414 B2 | 3/2008 | Roh et al. |
| 7,412,260 B2 | 8/2008 | Gailey et al. |
| 7,437,295 B2 | 10/2008 | Pitts, III et al. |
| 7,496,526 B2 | 2/2009 | Razumov |
| 7,532,947 B2 | 5/2009 | Waddington et al. |
| 7,590,538 B2 | 9/2009 | St. John |
| 7,603,287 B2 | 10/2009 | Kargman |
| 7,613,636 B2 | 11/2009 | Kargman |
| 7,652,558 B2 | 1/2010 | Lovegreen et al. |
| 7,664,736 B2 | 2/2010 | Jung et al. |
| 7,676,400 B1 * | 3/2010 | Dillon .................. G06Q 30/02 |
| | | 705/26.7 |
| 7,694,881 B2 | 4/2010 | Jung et al. |
| 7,698,228 B2 | 4/2010 | Gailey et al. |
| 7,699,219 B2 | 4/2010 | Drummond et al. |
| 7,730,160 B2 | 6/2010 | Moricz |
| 7,774,236 B2 | 8/2010 | Steres et al. |
| 7,776,372 B2 | 8/2010 | Hrudka |
| 7,778,884 B2 | 8/2010 | Bamborough et al. |
| 7,835,946 B2 | 11/2010 | Goren et al. |
| 7,840,591 B2 | 11/2010 | Lutnick |
| 7,860,757 B2 | 12/2010 | Cotton et al. |
| 7,882,150 B2 | 2/2011 | Badyal |
| 7,886,964 B2 | 2/2011 | Steinecker |
| 7,940,914 B2 | 5/2011 | Petrushin |
| 7,945,479 B2 | 5/2011 | Asher et al. |
| 7,970,118 B2 | 6/2011 | O'Dell, III |
| 7,974,873 B2 | 7/2011 | Simmons et al. |
| 8,031,858 B2 | 10/2011 | Miller et al. |
| 8,032,427 B1 | 10/2011 | Spreen et al. |
| 8,065,291 B2 | 11/2011 | Knorr |
| 8,068,599 B2 | 11/2011 | Sarin et al. |
| 8,069,070 B2 | 11/2011 | Papili et al. |
| 8,086,495 B2 | 12/2011 | Ansari et al. |
| 8,123,130 B2 | 2/2012 | Pentel |
| 8,126,777 B2 | 2/2012 | Postelnik et al. |
| 8,150,737 B2 | 4/2012 | Lutnick et al. |
| 8,150,738 B2 | 4/2012 | Lutnick |
| 8,190,483 B2 | 5/2012 | Woycik et al. |
| 8,200,550 B2 | 6/2012 | Aitkins |
| 8,204,757 B2 | 6/2012 | Carlson et al. |
| 8,212,833 B2 | 7/2012 | Kargman |
| 8,271,336 B2 | 9/2012 | Mikurak |
| 8,311,901 B1 | 11/2012 | Carmichael et al. |
| 8,346,624 B2 | 1/2013 | Goad et al. |
| 8,363,814 B2 | 1/2013 | Shaffer et al. |
| 8,417,258 B2 | 4/2013 | Barnes, Jr. |
| 8,433,617 B2 | 4/2013 | Goad et al. |
| 8,436,826 B2 | 5/2013 | Lam |
| 8,438,089 B1 | 5/2013 | Wasserblat et al. |
| 8,452,667 B1 | 5/2013 | Shimoff et al. |
| 8,521,745 B2 | 8/2013 | Probst et al. |
| 8,565,735 B2 | 10/2013 | Wohlwend et al. |
| 8,577,739 B2 | 11/2013 | Ansari et al. |
| 8,600,821 B2 | 12/2013 | Borders et al. |
| 8,626,590 B2 | 1/2014 | Istfan |
| 8,645,274 B2 | 2/2014 | Hasson |
| 8,650,095 B1 | 2/2014 | Shimoff et al. |
| 8,655,743 B1 | 2/2014 | Shimoff et al. |
| 8,660,903 B1 | 2/2014 | Croak et al. |
| 8,676,663 B1 | 3/2014 | Robinson et al. |
| 8,732,101 B1 | 5/2014 | Wilson et al. |
| 8,738,449 B1 | 5/2014 | Cupps et al. |
| 8,743,073 B2 | 6/2014 | Lam |
| 8,744,913 B2 | 6/2014 | Nasrallah |
| 8,805,729 B2 | 8/2014 | Afram et al. |
| 8,880,420 B2 | 11/2014 | Scotto |
| 8,930,245 B2 | 1/2015 | Streich |
| 8,971,503 B1 | 3/2015 | Kargman |
| 2002/0038261 A1 | 3/2002 | Kargman et al. |
| 2002/0049644 A1 | 4/2002 | Kargman |
| 2002/0067827 A1 | 6/2002 | Kargman |
| 2002/0184109 A1 | 12/2002 | Hayet et al. |
| 2002/0188492 A1 | 12/2002 | Borton |
| 2004/0111321 A1 | 6/2004 | Kargman |
| 2004/0158494 A1 | 8/2004 | Suthar |
| 2004/0267616 A1 | 12/2004 | Kargman |
| 2005/0015256 A1 | 1/2005 | Kargman |
| 2005/0021407 A1 | 1/2005 | Kargman |
| 2005/0045728 A1 | 3/2005 | Kargman |
| 2005/0049922 A1 | 3/2005 | Kargman |
| 2005/0108097 A1 | 5/2005 | McAleenan |
| 2005/0209914 A1 | 9/2005 | Nguyen et al. |
| 2005/0220009 A1 | 10/2005 | Kargman |
| 2005/0267811 A1 | 12/2005 | Almblad |
| 2006/0010037 A1 | 1/2006 | Angert et al. |
| 2006/0041482 A1 | 2/2006 | Awiszus et al. |
| 2006/0080163 A1 | 4/2006 | Sutcliffe |
| 2006/0080165 A1 | 4/2006 | Sutcliffe |
| 2006/0122896 A1 | 6/2006 | Parsley |
| 2006/0123098 A1 | 6/2006 | Asher et al. |
| 2006/0155753 A1 | 7/2006 | Asher et al. |
| 2006/0155770 A1 | 7/2006 | Asher et al. |
| 2006/0173754 A1 | 8/2006 | Burton et al. |
| 2006/0178943 A1 | 8/2006 | Rollinson et al. |
| 2006/0178951 A1 | 8/2006 | Rund, III |
| 2006/0206390 A1 | 9/2006 | Asano |
| 2006/0218039 A1 | 9/2006 | Johnson |
| 2006/0293965 A1 | 12/2006 | Burton |
| 2007/0061225 A1 | 3/2007 | Havas |
| 2007/0073586 A1 | 3/2007 | Dev et al. |
| 2007/0088624 A1 | 4/2007 | Vaughn et al. |
| 2007/0106565 A1 | 5/2007 | Coelho |
| 2007/0150321 A1 | 6/2007 | Zhao et al. |
| 2007/0150349 A1 | 6/2007 | Handel et al. |
| 2007/0150375 A1 | 6/2007 | Yang |
| 2007/0162849 A1 | 7/2007 | Marciano |
| 2007/0208626 A1 | 9/2007 | Awiszus |
| 2007/0276651 A1 | 11/2007 | Bliss et al. |
| 2008/0082420 A1 | 4/2008 | Kargman et al. |
| 2008/0097861 A1 | 4/2008 | Awiszus et al. |
| 2008/0208697 A1 | 8/2008 | Kargman et al. |
| 2008/0229430 A1 | 9/2008 | Kargman |
| 2008/0262972 A1 | 10/2008 | Blake |
| 2009/0048890 A1 | 2/2009 | Burgh |
| 2009/0077000 A1 | 3/2009 | Begole et al. |
| 2009/0099972 A1 | 4/2009 | Angert et al. |
| 2009/0106124 A1 | 4/2009 | Yang |
| 2009/0119180 A1 | 5/2009 | Moraysky et al. |
| 2009/0150193 A1 | 6/2009 | Hong et al. |
| 2009/0167553 A1 | 7/2009 | Hong et al. |
| 2009/0204492 A1 | 8/2009 | Scifo et al. |
| 2009/0228325 A1 | 9/2009 | Simmons et al. |
| 2009/0240598 A1 | 9/2009 | Kargman |
| 2009/0261162 A1 | 10/2009 | Kargman et al. |
| 2009/0265216 A1 | 10/2009 | Flynn et al. |
| 2009/0276347 A1 | 11/2009 | Kargman |
| 2009/0307079 A1 | 12/2009 | Martin, Jr. |

(56) References Cited

U.S. PATENT DOCUMENTS

| | | |
|---|---|---|
| 2009/0307096 A1 | 12/2009 | Antonellis |
| 2010/0023410 A1 | 1/2010 | Doan |
| 2010/0046510 A1 | 2/2010 | Koster et al. |
| 2010/0094715 A1 | 4/2010 | Kim et al. |
| 2010/0106607 A1 | 4/2010 | Riddiford et al. |
| 2010/0241707 A1 | 9/2010 | Burton et al. |
| 2010/0274633 A1 | 10/2010 | Scrivano et al. |
| 2011/0011936 A1 | 1/2011 | Morandi et al. |
| 2011/0022477 A1* | 1/2011 | Hatridge ............... G06Q 30/02 705/14.67 |
| 2011/0040654 A1 | 2/2011 | Lutnick et al. |
| 2011/0078637 A1 | 3/2011 | Inderrieden et al. |
| 2011/0082773 A1 | 4/2011 | Potter |
| 2011/0153457 A1 | 6/2011 | Hinks |
| 2011/0173041 A1 | 7/2011 | Breitenbach et al. |
| 2011/0218839 A1 | 9/2011 | Shamaiengar |
| 2011/0258058 A1 | 10/2011 | Carroll et al. |
| 2012/0016745 A1 | 1/2012 | Hendrickson |
| 2012/0022883 A1 | 1/2012 | Morrison |
| 2012/0036017 A1 | 2/2012 | Hasson |
| 2012/0036028 A1 | 2/2012 | Webb |
| 2012/0130817 A1* | 5/2012 | Bousaleh ............... G06Q 30/02 705/14.58 |
| 2012/0215657 A1 | 8/2012 | Compton et al. |
| 2012/0296679 A1 | 11/2012 | Im |
| 2013/0007615 A1 | 1/2013 | Goldman |
| 2013/0073477 A1 | 3/2013 | Grinberg |
| 2013/0080269 A1 | 3/2013 | Awiszus |
| 2013/0097054 A1 | 4/2013 | Breitenbach et al. |
| 2013/0124355 A1 | 5/2013 | Wazihullah |
| 2013/0124449 A1 | 5/2013 | Pickney et al. |
| 2013/0130208 A1 | 5/2013 | Riscalla |
| 2013/0144696 A1 | 6/2013 | Raisch |
| 2013/0144730 A1 | 6/2013 | Harman |
| 2013/0151357 A1 | 6/2013 | Havas et al. |
| 2013/0191243 A1 | 7/2013 | Jung et al. |
| 2013/0204718 A1 | 8/2013 | Freeman |
| 2013/0218692 A1 | 8/2013 | Fischer |
| 2013/0226651 A1 | 8/2013 | Napper |
| 2013/0238451 A1 | 9/2013 | Riscalla |
| 2013/0246146 A1* | 9/2013 | Fischer ............... G06Q 30/0222 705/14.23 |
| 2013/0317921 A1 | 11/2013 | Havas |
| 2013/0325641 A1 | 12/2013 | Brown et al. |
| 2013/0339163 A1 | 12/2013 | Dumontet et al. |
| 2014/0032341 A1 | 1/2014 | Balasubramanian et al. |
| 2014/0046789 A1 | 2/2014 | Baliga |
| 2014/0058901 A1 | 2/2014 | Kim et al. |
| 2014/0114776 A1 | 4/2014 | Solanki et al. |
| 2014/0121811 A1 | 5/2014 | Jung et al. |
| 2014/0156399 A1 | 6/2014 | Jones et al. |
| 2014/0188637 A1 | 7/2014 | Balasubramaniam et al. |
| 2014/0214465 A1 | 7/2014 | L'Heureux et al. |
| 2014/0222530 A1 | 8/2014 | Wegner et al. |
| 2014/0229301 A1 | 8/2014 | Wu |
| 2014/0249937 A1 | 9/2014 | McNally |
| 2014/0316914 A1 | 10/2014 | Ramini |
| 2014/0330671 A1 | 11/2014 | Mierle et al. |
| 2014/0330672 A1 | 11/2014 | Mierle et al. |
| 2014/0330681 A1 | 11/2014 | Mierle |
| 2014/0343976 A1 | 11/2014 | Ahluwalia et al. |
| 2014/0358778 A1 | 12/2014 | Banerjee et al. |
| 2014/0364164 A1 | 12/2014 | Griffin |
| 2015/0039450 A1 | 2/2015 | Hernblad |
| 2015/0046271 A1 | 2/2015 | Scholl et al. |
| 2015/0088676 A1 | 3/2015 | Elliott et al. |

FOREIGN PATENT DOCUMENTS

| | | |
|---|---|---|
| WO | WO 2001011523 | 2/2001 |
| WO | WO 2001073750 | 10/2001 |
| WO | WO 2014151806 | 9/2014 |

OTHER PUBLICATIONS

'IBM Guidelines' [online]. "Guidelines for estimating CPLEX memory requirements based on problem size," Apr. 9th, 2012 [retrieved on Jun. 8, 2015]. Retrieved from the Internet: URL: http://www-01.ibm.com/support/docview.wss?uid—swg21399933, 3 pages.

Clarke and Wright, "Scheduling vehicles from a central depot to a number of delivery points," Operations Res., 12:568-581 (1964).

Cook, Chpt 1 "Challenges," In Pursuit of the Travelling Salesman: Mathematics at the Limits of Computation, Princeton University Press, 2011, 20 pages.

Edwards et al., "A Methodology and Implementation for Analytic Modeling in Electronic Commerce Applications," Electronic Commerce Technologies, Lecture notes in computer science, 2040:148-157, 2001.

Fingas, "Square's new restaurant delivery app lets you track your meal," engadget, (Dec. 4, 2014), 6 pages http://www.engadget.com/2014/12/04/caviar-for-iphone/.

Fitchard, "Where's that delivery guy? GrubHub intros meal tracking," (Nov. 13, 2012), 4 pages https://gigaom.com/2012/11/13/wheres-that-delivery-guy-grubhub-intros-meal-tracking/.

Medji, Chpt 5 "Network of Queues," Stochastic Models in Queuing Theory, Elsevier Academic Press, 2002, 35 pages.

Mingozzi et al., "Dynamic programming strategies and reduction techniques for the traveling salesman problem with time windows and precedence constraints," Operations Research, 45:365-377 (1997).

Munkres, "Algorithms for the Assignment and Transportation Problems," J Soc Indust Appl Math., 5(1):32-38 (Mar. 1957).

Rodriguez, "Amazon says it sold 426 items a second on Cyber Monday," LA Times, (Dec. 26, 2013), 2 pages http://articles.latimes.com/2013/dec/26/business/la-fi-tn-amazon-sold-426-items-per-second-cyber-monday-20131226.

* cited by examiner

USER INTERFACE GENERATION FOR TRANSACTING GOODS

TECHNICAL FIELD

This application generally relates to generating user interfaces.

BACKGROUND

Customers may access websites or applications to purchase food or other goods. Websites or applications may list the goods that are available for purchase, and the user may complete a purchase by selecting an item and providing payment information. After the purchase, the user may receive a receipt for the purchase, e.g., via email. If the user pays with a credit card, the transaction will appear on the user's credit card statement.

SUMMARY

In response to a purchase, the vendor may generate a record of the purchase, including a purchase price, the goods purchased, the date, and the shipping address, and may email a receipt to a purchaser. A credit card company may generate a record that identifies the vendor, the purchase price, and a date. Customers may also generate records of their purchases, e.g., by entering a purchase price into an online money management application, or by posting information about the purchase to social media.

With the permission of the purchaser, a system may collect any or all of this information, and may process this information to generate a purchase history. The purchase history may include, for each purchase, a data item that includes data that identifies a customer, a purchase date, a type of good purchased, and a confidence score. The system generates these data items by comparing the purchase data, financial data, and social media data to identify purchases by different customers from different vendors. The system accesses data that identifies the types of goods sold by each vendor to generate the data items. The system then stores the data items.

The system analyzes the data items for patterns. Some of the patterns that the system may identify include a customer purchasing a particular type of good on specific days of the week, a customer purchasing a particular type of good the day after purchasing another type of good, or a customer purchasing or not purchasing a particular type of good on a specific day of the month. Based on these patterns, the system may infer or generate rules, such as rules for generating user interfaces for purchasing other goods or for providing marketing material. The rules may be created to entice a customer to purchase items the customer may already be inclined to purchase, or items that the customer may not typically purchase, as suggested by the patterns. For example, a rule may specify that, on specific days, a type of good that a customer is less likely to purchase should be moved to a more prominent position in an order taking user interface, or that a type of good that a customer is less likely to purchase should be discounted.

The next time that a customer accesses a vendor's website or opens a vendor's application, the system accesses the rules and identifies a rule that corresponds a current scenario. For example, a rule based on a pattern of repeated pizza purchase on Fridays by a particular customer may instruct an application to generate a user interface to discount salads and sandwiches when the customer accesses the application on Fridays. The system accesses this rule and generates a user interface to present to the user that includes pizza at the regular price and discounted salads and sandwiches. The customer may select a pizza as the customer typically does on Friday, but also purchase a salad and a sandwich because both are on sale, thus increasing the purchase total for the customer over what is expected.

According to one innovative aspect of the subject matter described in this specification may be implemented in a method that includes the actions of receiving, from one or more computers, order data, user data, and other data; based on the order data, the user data, and the other data, determining, for a particular user, an order confidence score that corresponds to a likelihood that the particular user ordered a particular good from a particular vendor on a particular day; receiving vendor-type mapping data that correlates each vendor with a type of good sold by a respective vendor; based on the vendor-type mapping data, determining a good-type confidence score that corresponds to the likelihood that the particular good or the particular vendor is associated with a particular type of good; based on the good-type confidence score and the order confidence score, determining a composite confidence score that corresponds to a likelihood that the particular user ordered the particular type of good on the particular day; and storing the composite confidence score, data identifying the particular user, data identifying the particular type of good, and data identifying the particular date.

These and other implementations can each optionally include one or more of the following features. The order data includes data associated with goods orders and dates that the goods were ordered. The user data includes data associated with location and application usage. The other data includes data associated with financial data, email data, and social media data. The vendor-type mapping data is received from one or more computers that store user ratings and reviews of vendors. The vendors are restaurants, the goods are food, and the types of goods are cuisines. The composite confidence score is an average of the good-type confidence score and the order confidence score.

Other implementations of this aspect include corresponding systems, apparatus, and computer programs recorded on computer storage devices, each configured to perform the operations of the methods.

According to one innovative aspect of the subject matter described in this specification may be implemented in a method that includes the actions of receiving, from an application running on a computing device, a request to order goods from a vendor, the request including data identifying a user of the computing device and the type of goods; identifying a particular rule, from a plurality of rules for generating a user interface of the application, that corresponds to the user, the type of the goods, and a current date; and based on the particular rule, generating an order-taking user interface.

These and other implementations can each optionally include one or more of the following features. The order-taking user interface identifies goods in a default configuration and at default prices. The order-taking user interface includes adjusting a default price for one or more of the goods listed in the order-taking user interface. Generating the order-taking user interface includes modifying the default configuration. The vendors are restaurants, the goods are food, and the types of goods are cuisines. Generating the order-taking user interface is further based on a location of the user. The actions further include identifying a second rule, from the plurality of rules, that corresponds to the user, the type of the goods, and a current date, where generating the order-taking user interface is based further on the second rule.

Other implementations of this aspect include corresponding systems, apparatus, and computer programs recorded on computer storage devices, each configured to perform the operations of the methods.

According to one innovative aspect of the subject matter described in this specification may be implemented in a method that includes the actions of receiving data tuples that each include a confidence score, data identifying a user, data identifying a type of good, and data identifying a date, each confidence score corresponding to a likelihood that the user purchased a respective type of good on a respective date; identifying patterns among the data tuples; based on one or more of the patterns, generating a rule for generating an order-taking user interface of an application for ordering goods; and storing the rule.

These and other implementations can each optionally include one or more of the following features. The rule includes instructions for adjusting a default price for one or more of the goods listed in the order-taking user interface. The rule includes instructions for modifying a default configuration of the order-taking user interface. Identifying patterns among the plurality of data tuples includes identifying a first group of the data tuples that identify a same type of good; identifying a second group of the data tuples that include a confidence score that satisfies a threshold, the first group of the data tuples including the second group of the data tuples; and identifying a pattern of the respective dates in the second group of the data tuples. The one or more of the patterns identifies repeated purchase of a particular type of good. The goods are food, and the types of goods are cuisines. Generating a rule for generating an order-taking user interface of an application for ordering goods includes generating a rule for increasing purchases initiated through the order-taking user interface.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. A system may generate order-taking user interfaces to increase user purchases.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
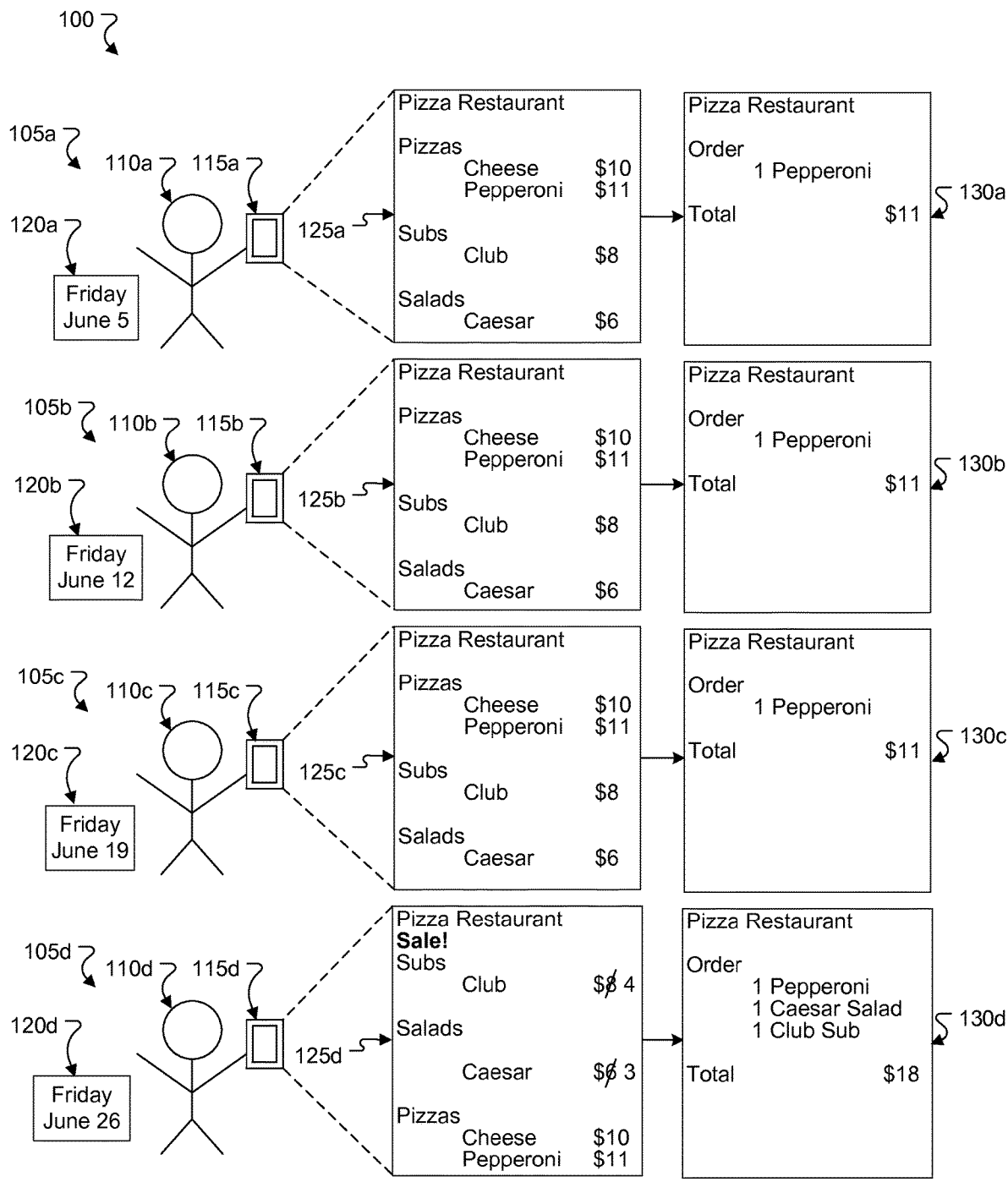
FIG. 1 illustrates various user interfaces that are displayed on a client device when a user orders goods from a vendor.

FIG. 1 illustrates various user interfaces that are displayed on a client device when a user orders goods from a vendor. Briefly, and as described in further detail below, scenarios 105a-105d illustrate a user 110 purchasing food using a mobile device 115 on various dates 120. To assist the user 110 in ordering food, the mobile device displays an ordering user interface 125 that includes the menu and prices. Once the user 110 selects the food to purchase, the mobile device displays a purchase user interface 130 that includes the order and the total.

In the example shown in FIG. 1, scenario 105a illustrates user 110a purchasing a pepperoni pizza using the mobile device 115a. On date 120a (in the figure, Friday, June 5), user 110a used a food ordering application on the mobile device 115a. The food ordering application running on the mobile device 115a may be an application for ordering from a particular restaurant, such as Pizza Restaurant, or may be an application for ordering from multiple restaurants, such as Pizza Restaurant and Sandwich Shop. The food ordering application displays an ordering interface 125a in the mobile device 115a. The ordering interface 125a includes a menu with the available foods and prices. In this example, the ordering interface 125a includes pizza at the top, with a cheese pizza at ten dollars and a pepperoni pizza at eleven dollars, subs in the middle, with a club at eight dollars, and salads at the bottom, with a Caesar salad at six dollars.

The user 110a selects the items to purchase from the user interface 125a. The next user interface displayed by the food ordering application is purchase user interface 13a. The purchase user interface 130a displays the items selected for purchase and the total price. In this example, the purchase user interface 130a displays one pepperoni pizza for a total of eleven dollars. The food ordering application may provide an additional user interface to accept payment information or include an interface to accept payment information on the user interface 130a.

Once the user places the order for food, the food ordering application may provide the order information to a server. The information may include the name of the restaurant, the food ordered, the date, and a user identifier. The server may aggregate the order information for user 110 and other users as well as other purchases by the user 110 and the other users. The server may receive order information from other applications or directly from restaurants and other vendors. Information received from other restaurants may only include information related to an order price and an order date. For example, a restaurant may provide information indication that a purchase for eleven dollars was made at 6:30 pm on June 5. The server stores this information and analyzes it to identify ordering patterns for different users.

Scenario 105b illustrates a similar pizza order as scenario 105a. In scenario 105b, user 110b accesses a food ordering application running on mobile device 115b on date 120b, Friday June 12. When user 110b accesses the food ordering application, the food ordering application may send a request to a server to determine an appropriate configuration for the ordering user interface 125b. The server may provide instructions for configuring the ordering user interface 125b or provide a response that indicates the food ordering application should use the default ordering user interface configuration. In this example, the server analyzed the data from scenario 105a and did not identify any ordering patterns, and therefore, ordering user interface 125b is similar to ordering user interface 125b.

The user 110b selects the items to order from the ordering interface 125b. Purchase interface 130b indicates that the user 110b ordered one pepperoni pizza for a total of eleven dollars. As before, the food ordering application may provide this order information to the server. The server may identify that the same user 110 placed this order as the order illustrated in ordering interface 130a. The server analyzes the data from scenarios 105a and 105b and identifies that user 110 ordered a pepperoni pizza on consecutive Fridays. Based on these two orders, the server may determine that the user 110 is likely to order a pepperoni pizza on a Friday, but a confidence associated with that determination may not be high enough to modify an ordering interface 125 or to provide coupons or other marketing materials to user 110.

Scenario 105c illustrates a similar pizza order as scenarios 105a and 105b. In scenario 105c, user 110c accesses a food ordering application running on mobile device 115c on date 120c, Friday June 19. When user 110c accesses the food ordering application, the food ordering application may send a request to a server to determine an appropriate configuration for the ordering user interface 125c. As noted above, the server may have identified a pattern where the user 110 orders a pepperoni pizza each Friday. However, a confidence associated with that pattern may not satisfy a threshold. Therefore, the server may not provide any modification instructions to the food ordering application regarding the arrangement of user interface 125c.

The user 110c selects the items to order from the ordering interface 125c. Purchase interface 130c indicates that the user 110c ordered one pepperoni pizza for a total of eleven dollars. As before, the food ordering application may provide this order information to the server. The server may now aggregate the orders from scenarios 105a, 105b, and 105c and identify a pattern of user 110 ordering a pepperoni pizza each Friday. The confidence associated with this pattern may be higher than when the server only had information from scenarios 105a and 105b and the confidence may be satisfy a threshold such that the server may generate a rule for generating the next ordering user interface. The rule may indicate that if user 110 attempts to place an order through the food ordering application on a Friday, then the food ordering application will display an ordering interface that includes discounts for salads and subs and place those discounts at a higher position on the ordering interface.

As illustrated in scenario 105d, user 110d accesses a food ordering application running on mobile device 115d on date 120d, Friday June 26. When user 110d accesses the food ordering application, the food ordering application may send a request to a server to determine an appropriate configuration for the ordering user interface 125d. As noted above, the server may have generated a rule for generating a user interface when the user 110 access the food ordering application on a Friday. Because the date 120d is Friday June 26, the server provides information to the food ordering application to generate a user interface 125d. Ordering user interface 125d includes an indication that Pizza Restaurant current has a sale. Ordering user interface 125d lists subs at a more prominent position on the page, e.g., the top, with a club at four dollars instead of eight, salads in the middle, with a Caesar salad at three dollars instead of six, and with pizza in a less prominent position, e.g., at the bottom, with a cheese pizza at ten dollars and a pepperoni pizza at eleven dollars.

When viewing the ordering user interface 125d, the user 110d may decide that the sub and salad sales are too good to pass up and order a club sub and Caesar salad along with the usual pepperoni pizza. Purchase user interface 130d illustrates the additional purchases of the sub and salad for a total of $18. Even though Pizza Restaurant sold the sub and salad at a discount, the total purchase price for user 110d was greater than the previous purchase prices.

Figure 2:
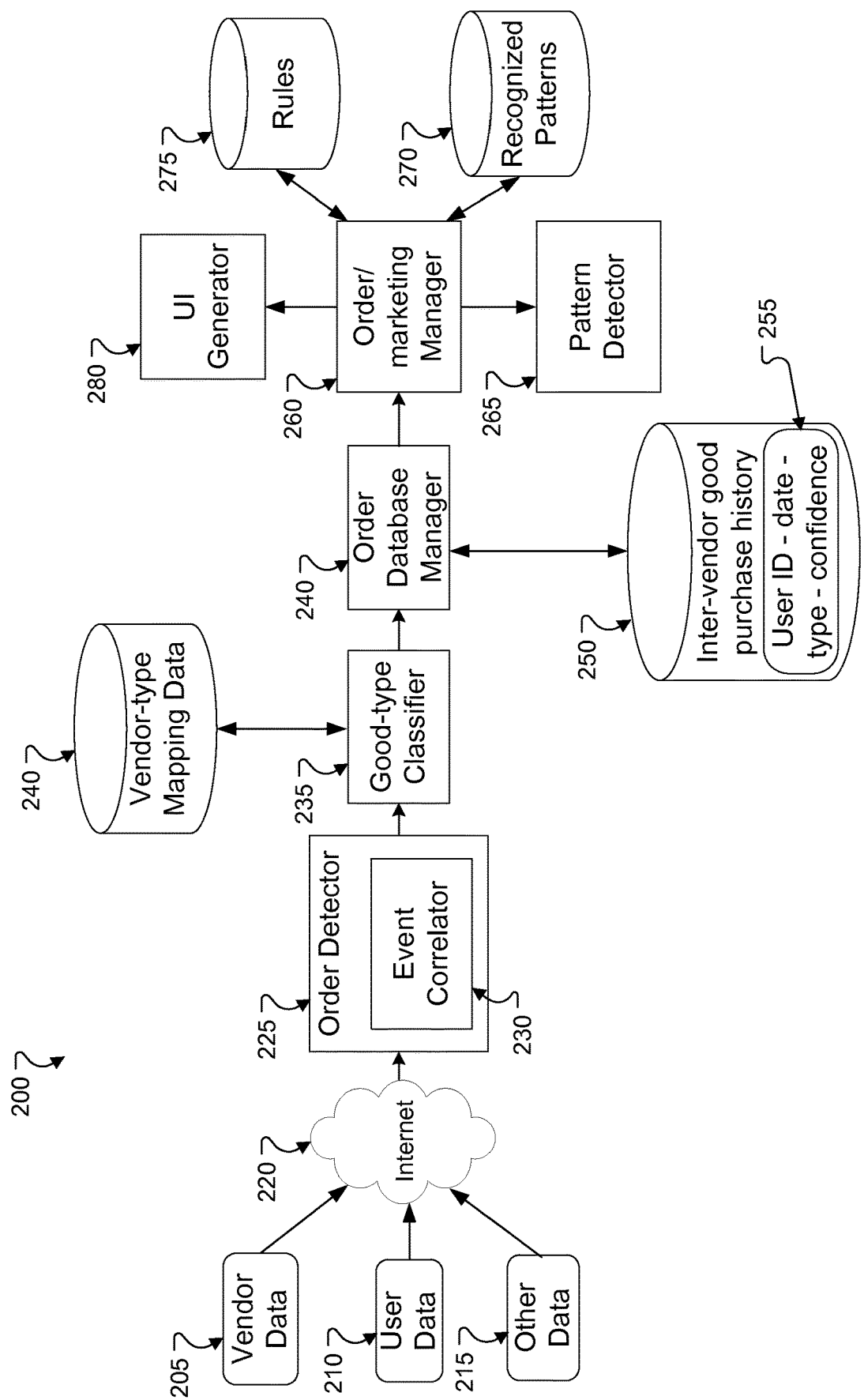
FIG. 2 illustrates an example system for ordering goods from a vendor.

FIG. 2 illustrates an example system 200 for ordering goods from a vendor. Briefly, and as described in further detail below, system 200 is configured to receive and analyze data related to vendor orders to identify patterns among users purchasing behavior. The system generates and stores rules for providing user interfaces and marketing information to users based on the patterns.

The system 200 receives data that includes vendor data 205, user data 210, and other data 215. The vendor data 205 includes data that vendors collect when each vendor makes a sale. In some implementations, the vendor data 205 includes the total purchase price and date of each order. For example, the vendor data 205 may include a data item that indicates that Pizza Restaurant sold twenty dollars of product on Jun. 5, 2015 at 6:30 pm. In some implementations, a data item may also include the products sold. For example, the twenty dollar order may also include information indicating that the order was for two cheese pizzas. In some implementations, the vendor may also collect loyalty card information. Each time a customer purchases an item the customer may provide the customer's loyalty card so that the vendor may associate multiple purchases with the same customer. The vendor data 205 may also include information that associates multiple purchases with particular customers. For example, the vendor data 205 may include information indicating that a particular customer purchased thirty dollars of goods on June 5 and that same customer, or at least a customer using the same loyalty card, purchased forty dollars of goods on June 9.

The user data 210 includes data received from a user's device, such as a mobile device, tablet computer, watch, television, laptop, desktop computer, or other computing device. The user's device may collect information through applications that a user accesses to purchase goods. The applications may be tied to a specific vendor. For example, the user may use an application for Pizza Restaurant to order food directly from Pizza Restaurant. The applications may be configured to place orders with multiple vendors. For example, an application may be configured to place orders with Pizza Restaurant, Sandwich Shop, and Veggie Palace. When a user places an order with a specific application, the application may collect data for the vendor name, the date and time, the goods ordered, the purchase price, a user identifier, and a device identifier. For example, a data item may include information related to a purchase of one hundred dollars for Cheetah running shoes from Shoe Store on Jun. 3, 2015 at 3:00 pm. The data item may also include information indicating that user runner41 made the purchase using the user's mobile device. The data item may also include location data. For example, if the user's mobile device includes a GPS, then the data item may include GPS coordinates of the location of the user's device when the user purchased the Cheetah running shoes.

The user data 210 may also include data that a user accesses through other applications that are not associated with ordering goods. The other applications may be applications that receive data when a user places an order or that a user posts data. For example, an email application may receive a receipt after a user orders goods and when the user reads the receipt, the contents of the email may be captured by the device and may include information such as the purchase time and date, goods ordered, vendor, and the user who placed the order. A social media application may receive data from a user when the user posts information related to a purchased product. A user may post "Just had a great meal at Pizza Restaurant." The text of the post, the location of the user device, any picture or video associated with the pose, and the time and date may be part of the associated data item.

The other data 215 includes data that is associated with purchasing goods and that may not be accessed by a user on a device. The other data 215 may include credit card data such as a list of purchase prices, vendors, and dates, paired with data identifying the owner of the credit card. Other financial information such as bank statements may be included in the other data 215. The other data 215 may include email and social media data. For example, a user may receive an email receipt after purchasing goods, but may not read the email. In this instance, the email may not be included in the user data 210 because the user did not read the email, but the email will likely be included in the other data 215. Emails that a user read may be included in both the user data 210 and the other data 215. The social media data may be posts that user did not create or access on one of the user's device. For example, a post may tag another user but the tagged user may not access the post on one of the user's devices. This post and similar posts may be included in the other data 215.

The order detector 225 of the system 200 receives the vendor data 205, user data 210, and other data 215 through the internet 220. In some implementations, the order detector 225 requests the vendor data 205, the user data 210, and the other data 215. In some implementations, the computing devices that store the vendor data 205, the user data 210, or the other data 215 push the data to the order detector 225. One or more of the computing devices that store the vendor data 205, the user data 210, or the other data 215 may provide their data to the order detector 225 at any particular time.

The order detector 225 identifies orders for goods among the vendor data 205, the user data 210, and the other data 215. The order detector 225 analyzes the vendor data 205, the user data 210, and the other data 215 and associates an order confidence score with each order. For example, the order detector 225 may identify a credit card payment on Sally's credit card to Pizza Restaurant for ten dollars on Jun. 7, 2015 at 7:00 pm. The order detector 225 may create a data item, or data tuple, that includes data identifying Sally, Pizza Restaurant, ten dollars, and Jun. 7, 2015 at 7:00 pm. Because the purchase was on Sally's credit card, the order detector 225 may associate a high order confidence score, such at 0.95 with the data item. The order detector 225 may create another data item based on data from a social media post. The social media post may be "Just had a great meal at Sandwich Shop" that was posted using Jack's device to Jack's account at 2:00 pm on Jun. 3, 2015 while at 123 Elm St. The order detector 225 may create a data item that includes data identifying Jack, Sandwich Shop, 123 Elm St., and Jun. 3, 2015 at 2:00 pm. Because the post was posted using Jack's device to Jack's account, the order detector 225 may associate a high order confidence score, such at 0.90 with the data item. The order detector 225 may create another data item based on data from a vendor. The order detector 225 may receive data indicating that Veggie Palace sold ten dollars of goods on Jun. 4, 2015 at 12:00 pm. The order detector 225 may create a data item that includes data indicating Veggie Palace, ten dollars, and Jun. 4, 2015 at 12:00 pm and associate it with an order confidence score of 0.95.

The order detector 225 may receive data indicating that Sally posted a picture to social media of a slice of pizza on Jun. 7, 2015 at 7:30 pm. Based on this information, the order detector 225 may create a data item that includes data identifying Sally, pizza, and Jun. 7, 2015 at 7:30 pm. Because it is unclear if the pizza was Sally's, the order detector may associate this data item with a middle order confidence score of 0.45. The order detector 225 may also receive data indicating that Emily posted "I'm hungry" to social media at Jun. 4, 2015 at 11:45 am while near Veggie Palace. The order detector 225 create a data item that includes data identifying Emily, Veggie Palace, and Jun. 4, 2015 at 11:45 am. Because it is unclear if Emily purchased food from Veggie Palace on June 4, the order detector 225 associates this data item with an order confidence score of 0.15.

The order detector 225 includes an event correlator 230 to reconcile different data items that may correspond to the same event. The event correlator 230 may adjust order confidence scores or combine data items or both. For example, the event correlator 230 may compare the data item that includes data identifying Sally, Pizza Restaurant, ten dollars, Jun. 7, 2015 at 7:00 pm, and 0.95 and the data item that includes data identifying Sally, pizza, Jun. 7, 2015 at 7:30 pm and, 0.45. The event correlator 230 may compare those two data items and determine that they both correspond to the same purchase event. The resulting data item may include data identifying Sally, Pizza Restaurant, pizza, ten dollars, Jun. 7, 2015 at 7:15 pm. The event correlator 230 may increase the order confidence score to 0.97.

As another example, the event correlator 230 may compare the data item that includes data indicating Veggie Palace, ten dollars, Jun. 4, 2015 at 12:00 pm, and 0.95 and the data item that includes data identifying Emily, Veggie Palace, Jun. 4, 2015 at 11:45 am, and 0.15. The event correlator 230 may compare these two data items and determine that there is a possibility that they both correspond to the same purchase event. The resulting data item may include data identifying Emily, Veggie Palace, ten dollars, Jun. 4, 2015 at 12:00 pm. The event correlator 230 may adjust the order confidence score to 0.30 because it may be unclear if the ten dollar order corresponds to Emily or if she even ate at Veggie Palace. The event correlator 230 may consider the popularity of various vendors when adjusting confidence scores. For example, if the event correlator 230 identifies many purchases around 12:00 pm on Jun. 4, 2015, the event correlator may be less certain that the ten dollar order correspond to Sally. If the event correlator 230 identifies few purchases around 12:00 pm on Jun. 4, 2015, the event correlator may be more certain that the ten dollar order correspond to Sally.

In some implementations, the event correlator 230 may delete data items when the event correlator 230 combines the data items into fewer data items. This may occur when the resulting order confidence score is higher than the previous order confidence scores. In some implementations, the event correlator 230 may not delete data items when the event correlator 230 combines the data items into fewer data items. This may occur when the resulting order confidence score is lower than the previous order confidence scores.

The order detector 225 provides the data items to the good-type classifier 235. the good-type classifier 235 matches a type of good that likely corresponds to the data item and updates the data item to reflect that type of good. The good-type classifier 235 also includes a good-type confidence score that reflects the certainty that the good-type corresponds to the data item. The good-type classifier 235 may access vendor-type mapping data 240 to determine the type of goods sold by a particular vendor. The vendor-type mapping data 240 may include data stored in good or product review web sites where the reviews are provided by an editor or directly by customers. The vendor-type mapping data 240 may also include data from websites that display goods for sale such as menus. The websites may be maintained by a vendor or by a third party.

In some implementations, the good-type classifier 240 may update the information stored in the vendor-type mapping data 240. The updated information may originate from the vendor data 205, the user data 210, and the other data 215. For example, order detector may have generated a data item that includes data identifying Emily, Veggie Palace, ten dollars, Jun. 4, 2015 at 12:00 pm. At 12:15 pm on that same day, Emily may have posted a picture of a salad to social media with the caption "Eating a salad at Veggie Palace." Using this information the good-type classifier 240 may update the vendor-type mapping data 240 for Veggie Palace to indicate that the restaurant sells salads.

As an example of the processing performed by the good-type classifier 235, the good type classifier 235 may receive a data item that includes data identifying Emily, Veggie Palace, ten dollars, Jun. 4, 2015 at 12:00 pm. Without considering a social media post by Emily with a picture of a salad and a caption describing a salad, the good type classifier 235 may access data related to Veggie Palace. The data related to Veggie Palace may include a menu and reviews by customers or editors. The good-type classifier 235 may analyze the menu and reviews to identify types of goods sold by Veggie Palace such as salads and sandwiches. This analysis may occur each time the good-type classifier 235 accesses the vendor-type mapping data 240 in response to receiving a data item, as the vendor-type mapping data 240 is updated, or periodically, such as when the good-type classifier 235 is not processing data items. Once the good-type classifier 235 determines that Veggie Palace sells salads and sandwiches with salads comprising most of the menu, the good-type classifier 235 may assign a good-type confidence score of 0.60 and the good-type salad to the data item that includes data identifying Emily, Veggie Palace, ten dollars, Jun. 4, 2015 at 12:00 pm. If the good-type classifier 235 takes into consideration the post of a picture of a salad, then the good-type confidence score may increase to 0.90.

The good-type classifier 235 may consider the popularity of particular items as described in reviews when calculating a good-type confidence score. The good-type classifier 235 may factor a higher likelihood that a customer purchases a popular good than an unpopular good. The good-type classifier 235 may identify the popular goods by analyzing the goods that are associated with higher praise in the reviews and less popular goods as the ones that are associated with more negative praise. Returning to the example with the data item that includes data identifying Emily, Veggie Palace, ten dollars, Jun. 4, 2015 at 12:00 pm, the good-type classifier 235 may analyze the reviews of Veggie Palace. Some of the reviews may be "The chef salad is great" and "Loved by chopped salad." There may be fewer positive review for the sandwiches. The good-type classifier 235 may factor in these reviews and calculate a good-type confidence score of 0.75 that the data item corresponds to a salad based on the reviews being more positive for the salad. The increase or decrease in the good-type confidence score may be proportional to the percentage of the reviews that discuss the good.

In some implementations, the good-type classifier 235 selects a good-type from a group of pre-determined good types. The pre-determined good types may be provided by an administrator or determined by the good-type classifier 235 after an initial processing of the vendor-type mapping data 240. For example, the good-type classifier 235 may analyze the vendor type mapping data 240 and determine that the type of goods are pizza, shoes, sandwiches, clothing, Chinese food, mobile devices, hardware, and makeup.

The good-type classifier provides 235 the data items that include both order confidence scores and good-type confidence scores to the order database manager 240. The order database manager 240 analyzes the data items and stores data items, or data tuples, of a consistent structure in the inter-vendor good purchase history 250. These structured data items 255, or structured data tuples, may include a user identifier, a date, a good type, and a confidence score. For example, the order database manager 240 may receive a data item that includes data identifying Sally, Pizza Restaurant, pizza, ten dollars, Jun. 7, 2015 at 7:15 pm with an order confidence score to 0.97 and a good-type confidence score of 0.95 to create a structured data item that includes data identifying Sally, Jun. 7, 2015, pizza, and a confidence score. The confidence score may be a combination of the order confidence score and the good-type confidence score. In some implementations, the confidence score is an average of the order confidence score and the good-type confidence score.

The inter-vendor good purchase history 250 includes structured data items for each of the vendors. For example, the inter-vendor good purchase history 250 may include a structured data item 255 that includes data identifying Sally, Jun. 7, 2015, pizza, and 0.96 and another structured data item 255 that includes data identifying Sally, Jun. 14, 2015, pizza, and 0.78. Each of these structured data items 255 may correspond to a different vendor. Sally may have made the first purchase from Pizza Restaurant and the second purchase from Brothers Pizza.

The order database manager 240 accesses the inter-vendor good purchase history 250 and provides the structured data 255 to the order/marketing manager 260. The ordering/marketing manager 260 receives a request from an application running on a user device for instructions to generate or provide a user interface to the user for ordering goods. The ordering/marketing manager 260 may also providing marketing material to a user based on the previous behavior and predicted behavior of a user.

To determine the appropriate user interface or marketing material to provide to the user's device, the ordering/marketing manager 260 provides structured data or data tuples 255 to the pattern detector 265 to identify patterns in the inter-vendor good purchase history 250. The ordering/marketing manager 260 stores the patterns in the recognized patterns 270. The pattern detector 265 may identify patterns for each user identified in the inter-vendor good purchase history 250. For example, the pattern detector 265 may receive data items that identify Jack, June 5, pizza, 0.95; Jack, June 12, pizza, 0.95; and Jack, June 19, pizza, and 0.90. The pattern detector 265 may identify a pattern that Jack orders pizza each Friday. The ordering/marketing manager 260 may store that pattern in the recognized patterns 270.

The pattern detector 265 may consider the confidence scores when detecting patterns. The pattern detector 265 may weigh a data tuple with a higher confidence score more than a data tuple a lower confidence score. For example, the pattern detector 265 may receive data items that identify Jack, June 5, pizza, 0.95; Jack, June 12, pizza, 0.95; and Jack, June 19, pizza, and 0.90. Additionally the pattern detector 265 may receive data items that identify Jack, June 5, Chinese food, 0.40. Because the Chinese food data includes a lower confidence score, the pattern detector 265 weighs that data less and identifies the pattern that Jack orders pizza each Friday.

The pattern detector 265 may compare data tuples that include types of goods in the same group when identifying patterns. For example, the pattern detector 265 may identify patterns among data tuples that include types of foods or identify patterns among data tuples that include types of music. If the pattern detector 265 receives data items that include data identifying Jack, June 5, pizza, 0.95; Jack, June 12, pizza, 0.95; Jack, June 19, pizza, and 0.90; Jack, June 5, jazz, 0.85; and Jack, June 12, blues, 0.80, then the pattern detector may only compare the data items related to types of food, when identifying a pattern related to types of food. In this instance, the pattern detector 265 will identify the pattern that Jack orders pizza each Friday and likely will not identify a pattern among music orders.

The pattern detector 265 may compare data tuples to identify patterns that involve more than one type of good in a group of similar goods. As an example, the pattern detector 265 may identify a pattern such as Jack orders pizza and Chinese food in the same day or Jack orders pizza the day after ordering Chinese food. The pattern detector 265 may identify patterns that involve types of goods in different groups. As an example, the pattern detector 265 may identify a pattern such as Jack orders pizza and purchases jazz music the same day or Jack orders pizza and purchases jazz music the following day.

The ordering/marketing manager 260 may periodically provide the structured data 255 to the pattern detector 265 or provide the structured data 255 when receiving a request for a user interface from a user device. For example, the ordering/marketing manager 260 may provide the structured data 255 to the pattern detector 265 each hour, day, week, or any similar interval. As another example, the ordering/marketing manager 260 may provide the structure data 255 to the pattern detector 265 when a user is accessing a vendor application.

The ordering/marketing manager 260 stores rules for generating and modifying user interfaces in the rules 275. The rules may include instructions for modifying user interfaces when a user is ordering goods from a vendor or when a user may be likely to order goods from a vendor. A user may be ordering goods from a vendor when the user accesses an application that is configured to order goods from the vendor such as a user accessing a pizza ordering application. The user may be likely to order goods from a vendor if the user is near a location of the vendor or if a pattern suggests that a user is more likely to order a particular type of good.

The ordering/marketing manager 260 may modify the rules in response to whether implementing a rule resulted in a purchase. As an example, a rule may state that Jack should receive a pizza coupon on Tuesday for purchase that day. This rule may be generated in response to the pattern detector 265 determining that Jack is likely to order pizza on Friday. To entice Jack to order pizza on other days of the week, the order/marketing manager 260 may provide a coupon to Jack for purchasing pizza on Tuesdays. If Jack does not purchase pizza on one or more Tuesdays, then the ordering/marketing manager 260 may adjust the coupon to be a discount for another day of the week, such as Mondays or a larger discount on Tuesdays.

As examples of rules that may be related to modifying user interfaces when a user is ordering goods, the ordering/marketing manager 260 may generate a rule discount goods that a user is less likely to purchase or place those goods more prominently in the user interface or both. Alternatively, the ordering/marketing manager 260 may generate a rule to increase the price of goods that a user is more likely to purchase or place those goods less prominently in the user interface or both.

The ordering/marketing manager 260 provides the rules to the user interface generator 280. The user interface generator 260 may provide a portion of a user interface to a user device or may provide instructions that are specific to a type of device. For example, the user interface generator 260 may generate list of goods for sale, such as a menu, that a device may incorporate into a user interface where the user selects the goods to purchase.

Figure 3:
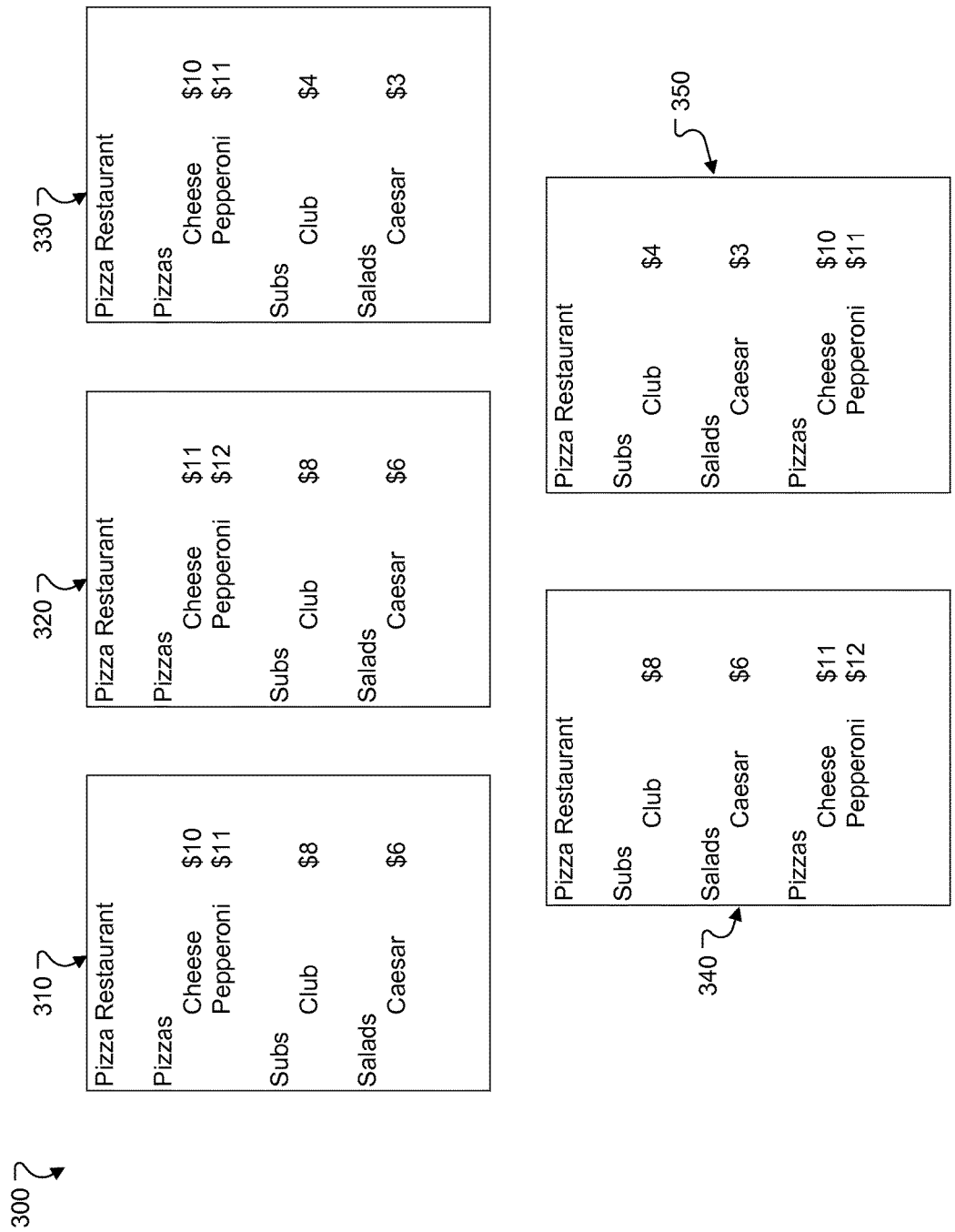
FIG. 3 illustrates various user interfaces for ordering goods from a vendor.

FIG. 3 illustrates various user interfaces for ordering goods from a vendor. The user interfaces 300 are presented on a user device when a user executes a vendor's application that is used to purchase goods from a vendor. Portions of the user interfaces 300 or instructions to generate the user interfaces 300 may be provided by a user interface generator that receives rules from an ordering/marketing manager, such as the user interface generator 260 of FIG. 2.

User interface 310 illustrates an example default interface for ordering from Pizza Restaurant. The user interface generator generates user interface 310 in the absence of a particular rule for generating a user interface. The user interface 310 includes regular prices for products sold by Pizza Restaurant. The products include pizza, subs, and salads. A user may select the items from the user interface 310 to purchase the items.

User interface 320 illustrates an example user interface that the user interface generator generates in instances where a user may be more likely to purchase pizza. The corresponding rule may be to increase the price of pizza on Friday. In user interface 320, the price of the pizza has increased by one dollar and the price of the remaining items has remained the same. The rule may include an amount to increase the prices such as a specific amount or a percentage.

User interface 330 illustrates an example user interface that the user interface generator generates in instances where a user is more likely to purchase a particular type of good than other types of goods. In user interface 330, the price of the subs and salads has been reduced by fifty percent. The price of the subs and salads being reduced may be because the customer is more likely to purchase pizzas than subs and salads. The user interface 330 may be displayed on a Friday to a particular customer and the rule may be to reduce the price of items other than pizza on Friday to that particular customer.

User interface 340 illustrates another example user interface that the user interface generator generates in instances where a user is more likely to purchase a particular type of good than other types of goods. In user interface 340, the price of the pizzas is increased and the subs and salads are listed at the top of the menu. The price increases and reconfiguration of the menu may be because the customer is more likely to purchase pizzas than subs and salads. The user interface 340 may be displayed on a Friday to a particular customer, and the rule may be to increase, on Friday, the price of pizza and place other items in more prominent positions on the user interface.

User interface 350 illustrates another example user interface that the user interface generator generates in instances where a user is more likely to purchase a particular type of good than other types of goods. In user interface 350, the price of the subs and salads has been reduced by fifty percent and the subs and salads are listed at the top of the menu. The price reductions and reconfiguration of the menu may be because the customer is more likely to purchase pizzas than subs and salads. The user interface 350 may be displayed on a Friday to a particular customer, and the rule may be to reduce, on Friday, the price of items other than pizza and place those items in more prominent positions on the user interface.

Figure 4:
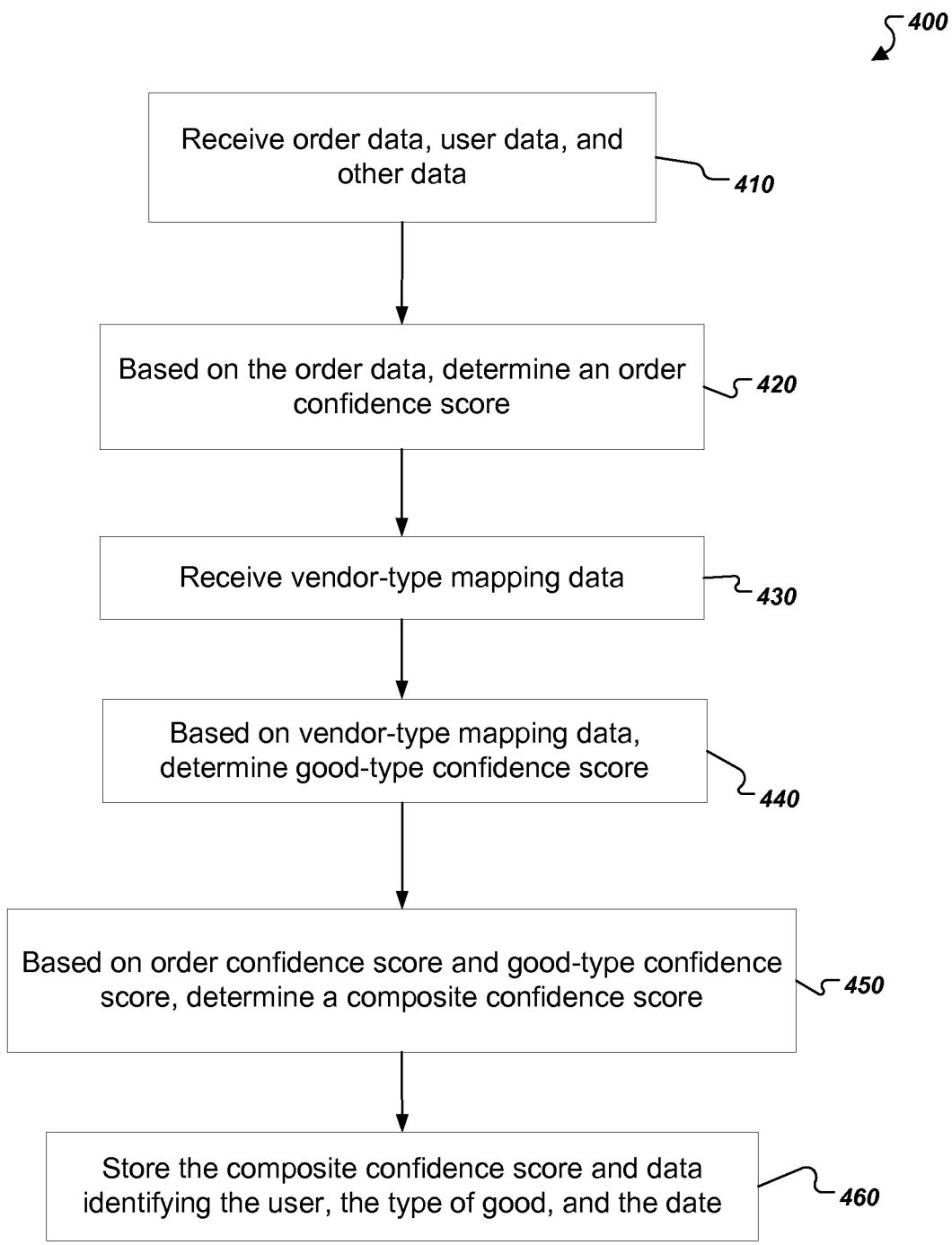
FIG. 4 is a flow chart of an example process generating a confidence score that a user purchased a type of good on a particular date.

FIG. 4 is a flow chart of an example process 400 generating a confidence score that a user purchased a type of good on a particular date. In general, the process 400 analyzes data to identify purchases of goods by different users and score data corresponding to the user, the type of goods, and a date of purchase. The process 400 will be described as being performed by a computer system comprising one or more computers, for example, the system 200 as shown in FIG. 2.

The system receives, from one or more computers, order data, user data, and other data (410). The order data may be received from vendors and may include, for each order, a list of goods and a corresponding date. Instead of a list of goods or in addition to, the order data may include a purchase price. The user data may include data that is collected from a user's interactions with a computing device. If a user reads an email on a device and that email includes a receipt, then that email may be provided to the system as user data. If a user access an application to order goods, then that interaction and purchase may be provided to the system as user data. The user data may also include a location of the user when the interaction occurred or a time indicated on a receipt. The other data includes financial data, email data, and social media data. For example, the financial data may include a list of purchase amounts, vendors, and dates.

Based on the order data, the user data, and the other data, the system determines, for a particular user, an order confidence score that corresponds to a likelihood that the particular user ordered a particular good from a particular vendor on a particular day (420). To determine an order confidence score, the system identifies different purchases from among the received data. An emailed receipt for pizza from Pizza Restaurant and a charge that same day for Pizza Restaurant provides a high likelihood and thus a high order confidence score for a purchase of pizza from Pizza Restaurant on that day. A social media post of a hamburger that occurred near Burger Shop may provide a lower likelihood that a user purchased a hamburger and thus a lower order confidence score for a purchase of a hamburger from Burger Shop on that day.

The system receives vendor-type mapping data that correlates each vendor with a type of good sold by a respective vendor (430). In some implementations, the system receives the vendor-type mapping data from systems that store user ratings and review of vendors. In some implementations, the vendor-type mapping data may be extracted from vendor websites such as those that contain menus or other goods for sale.

Based on the vendor-type mapping data, the system determines a good-type confidence score that corresponds to the likelihood that the particular user ordered a particular type of good on the particular type of day (440). The good-type confidence score is related to a likelihood that a user purchased a particular type of good. In some implementations, the vendor is a restaurant, the good is food, and the type of good is a cuisine. The good-type confidence score may be higher if a vendor only sells one type of good, such as Sandwich Shop only selling sandwiches. The good-type confidence score may be lower if a vendor sells multiple types of goods, such as Jimmy's Restaurant selling Chinese food, Indian food, and tex-mex food.

Based on the good-type confidence score and the order confidence score, the system determines a composite confidence score that corresponds to a likelihood that the particular user ordered the particular type of good on the particular day (450). In some implementations, the composite confidence score is an arithmetic or geometric mean of the good-type confidence score and the order confidence score. For example, if the good-type confidence score is 0.80 and the order confidence score is 0.70, then the composite confidence score is 0.75.

The system stores the composite confidence score, data identifying the particular user, data identifying the particular type of good, and data identifying the particular date (460). In some implementations, the system stores this data in a fixed format. For example, each data item, or data tuple, may have a format of (composite confidence score, user identifier, type of good, date). In some implementations, the date also includes the time of day or a time range.

Figure 5:
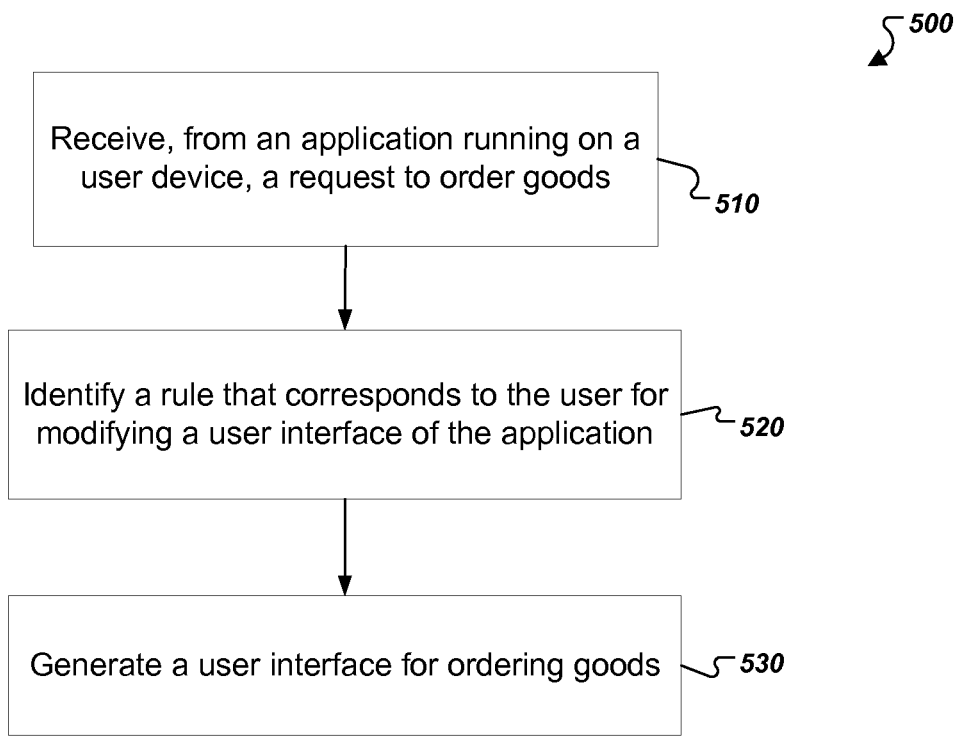
FIG. 5. is a flow chart of an example process for generating a user interface to order goods.

FIG. 5. is a flow chart of an example process 500 for generating a user interface to order goods. In general, the process 500 generated a user interface for ordering goods based on rules generated from previous purchases. The process 500 will be described as being performed by a computer system comprising one or more computers, for example, the system 200 as shown in FIG. 2.

The system receives, from an application running on a computing device, a request to order goods from a vendor, the request including data identifying a user of the computing device and the type of goods (510). The application running on the computing device may be a vendor specific application that is configured to sell goods from a particular vendor, or an application that is configured to sell goods from multiple vendors. The computing device may run a browser that loads a web page for one or more vendors to sell goods. The data identifying the user may be data tied to an identifier of the device such as a device address or may be data that identifies the user from logging into the application or the web page. To identify the type of goods, the system may retrieve vendor-type mapping data that corresponds to the vendor. In some implementations, the vendor is a restaurant, the goods are good, and the type of goods are cuisines. In some implementations, the request includes a location of the computing device.

The system identifies a particular rule, from a plurality of rules for generating a user interface of the application, that corresponds to the user, the type of the goods, and a current date (520). The particular rule may include instructions for changing prices of particular goods or types of goods or modifying a layout of a default user interface. The particular rule may be specific to a user, a group of users, or users with a specific characteristic such as being at a particular location. In some implementations, a rule may specify to provide a user with marketing material based on a user activity, such as being near a specific location.

Based on the particular rule, the system generates an order-taking user interface (530). In some implementations, the order-taking user interface has a default configuration and default prices. The default order-taking user interface is provided to a user in the absence of a rule describing how to generate the order-taking user interface.

In some implementations, the system identifies a second rule that that corresponds to the user, the type of goods, and the current date. The system may generate the order-taking user interface according to both the first and second rule. In instances where the rules conflict, the system may not modify the order-taking interface or select one of the rules based upon whether following one of the rules resulted in the user purchasing more goods.

Figure 6:
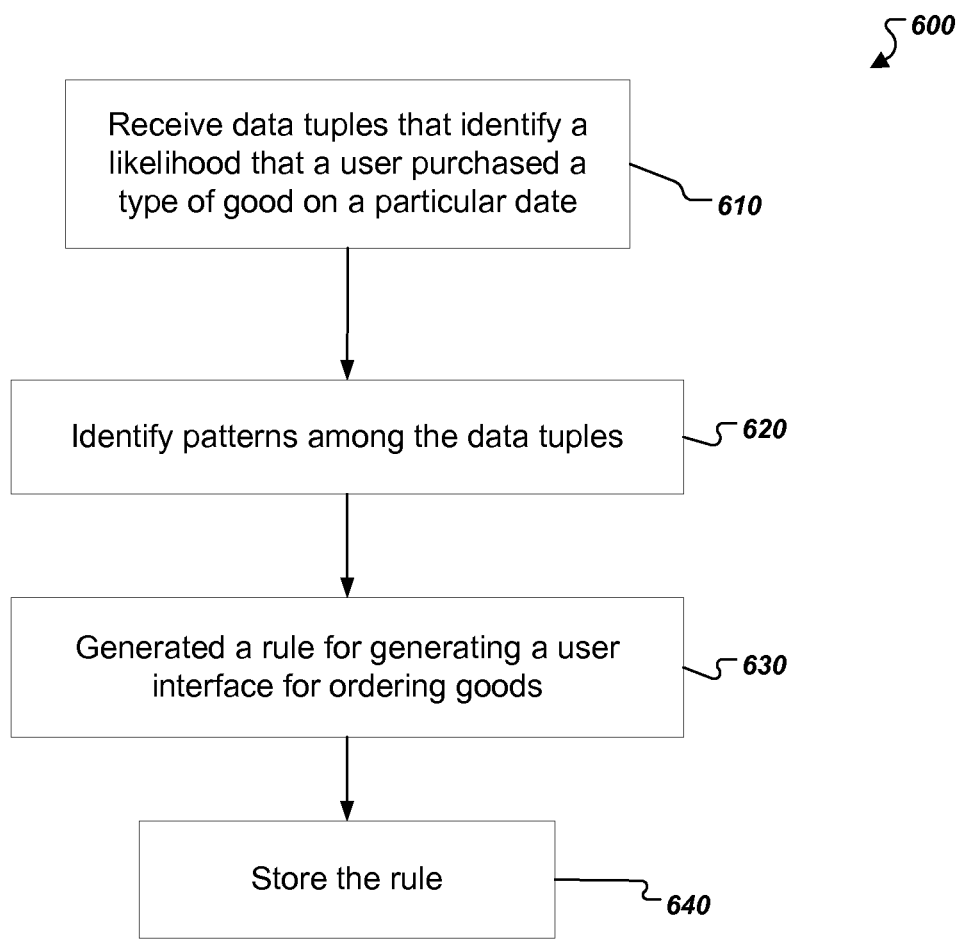
FIG. 6 is a flow chart of an example process for generating rules to generate user interfaces for ordering goods.

FIG. 6 is a flow chart of an example process 600 for generating rules to generate user interfaces for ordering goods. In general, the process 600 analyzes data tuples, or data items, to identify patterns and corresponding rules to generated order-taking user interfaces. The process 600 will be described as being performed by a computer system comprising one or more computers, for example, the system 200 as shown in FIG. 2.

The system receives data tuples that each include a confidence score, data identifying a user, data identifying a type of good, and data identifying a date, each confidence score corresponding to a likelihood that the user purchased a respective type of good on a respective date (610). In some implementations, the goods are food and the types of goods are cuisines. In some implementations, the system periodically receives the data tuples such as once per day or once per week. In some implementations, the system requests the data tuples in response to receiving a request for an order-taking user interface or marketing material. The system may request data tuples that correspond to a particular user.

The system identifies patterns among the data tuples (620). To identify patterns in the data tuples, the system groups the data tuples into groups according to users. The system analyzes the data tuples in each group that include a confidence score that satisfies a threshold. The threshold may be dynamic depending on the number of data tuples in each group. The system may require data tuples with a higher confidence score when more data tuples correspond to a user. The threshold may also adjust based on a number of rules that correspond to a user. Fewer rules may trigger a reduced threshold. The patterns may be based on repeated purchase of a particular type of good. The repeated purchase may occur on a periodic basis or when a user is near a particular location. For example, a pattern may be that a user purchases pizza when within 0.1 miles of a pizza vendor.

Based on one or more of the patterns, the system generates a rule for generating an order-taking user interface of an application for ordering goods (630). Each rule may include instructions for adjusting prices listed for goods on the order-taking user interface or for modifying a default configuration of the order-taking user interface. The system generates the rule to increase purchases made by a user. In some implementations, the system generates rules to purchase different goods. For example, the system may generate a rule to discount salads for a user who purchases a lot of pizza. The system stores the rule (640).

Figure 7:
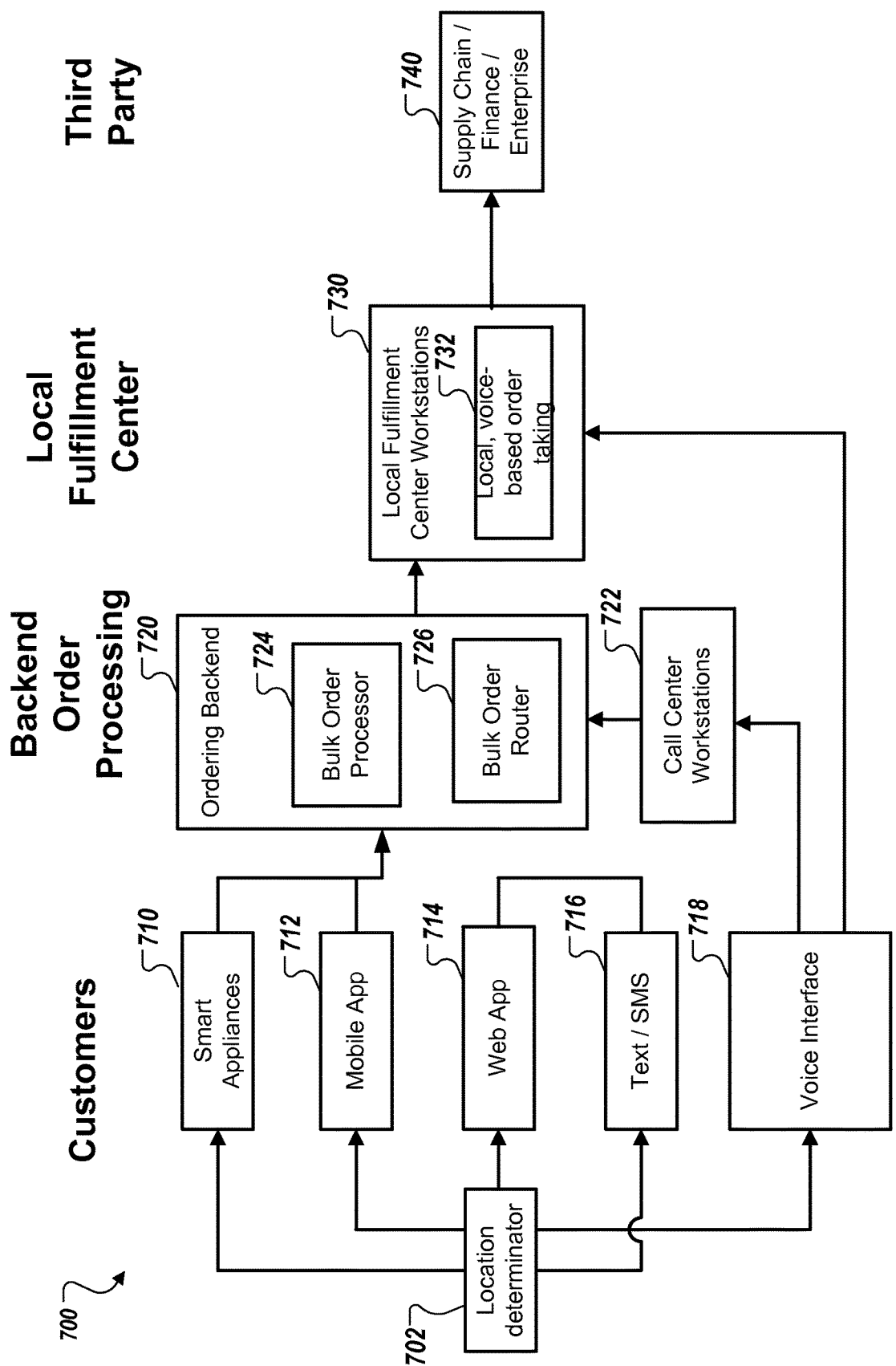
FIG. 7 is a block diagram of an example system for ordering goods.

FIG. 7 is a block diagram of an example system 700. Briefly, and as described in further detail below, the system 700 may include a location determinator 702, smart appliances 710, a mobile application 712, a web application 714, a text or short message service (SMS) application 716, a voice interface 718, an ordering backend 720, call center workstations 722, local fulfillment center workstations 730, and a supply chain, finance, or enterprise component 740. The system 700 may provide for real time delivery of an item. Real time delivery may include point-to-point delivery of small, tangible, purchased goods within a very short period of time of purchase, e.g., few minutes to a few hours. Purchased goods may include typical packaged goods that do not otherwise require real-time delivery, e.g., consumer electronics or office supplies, goods that degrade over a long period of time, e.g., groceries or flowers, or goods that degrade within a very short period of time, e.g., dry ice, ice cream, hot pizza or a cup of coffee.

The location determinator 702 may determine location information for a customer. For example, the location determinator 702 may determine a customer's location based on or more of a service set identifier (SSID) of a nearby detected wireless network, a detected phone mast signal, determined global positioning system (GPS) information, an assigned Internet Protocol (IP) address, a landline location, or a wireless media access control (MAC) address. The location determinator 702 may provide the location information to the smart appliances 710, the mobile application 712, the web application 714, the text or short message service (SMS) application 716, and the voice interface 718.

The smart appliances 710, the mobile application 712, the web application 714, the text or short message service (SMS) application 716, and the voice interface 718 may enable a customer to place an order. For example, one or more of the smart appliances 710, the mobile application 712, the web application 714, the text or short message service (SMS) application 716, and the voice interface 718 may enable a customer to place an order for a cheese pizza to be delivered to the customer's home address at 6:00 PM. To enable customers to place orders, the smart appliances 710, the mobile application 712, the web application 714, the text or short message service (SMS) application 716, and the voice interface 718 may provide interfaces through which the customer may specify a particular item to order, and a particular location for which the customer would like to obtain the item. For example, the smart appliances 710, the mobile application 712, the web application 714, the text or short message service (SMS) application 716, and the voice interface 718 may visually or audibly provide prompts to the customer requesting that the customer specify a particular item to order, a particular location to receive the item, and a particular time to receive the item.

More specifically, the smart appliances 710 may be appliances that may be used to place orders. For example, the smart appliances 710 may include a television that may be used by a customer to place an order for a pizza. The smart appliances 710 may provide an interface for a customer to place an order. For example, the smart appliance 710 may include a display that may render an interface for the customer to order a pizza. The smart appliances 710 may provide orders to an ordering backend 720. For example, the smart appliances 710 may provide an order for a pizza through a network to the ordering backend 720.

The mobile application 712 may be an application running on a mobile device that enables a customer to place an order. For example, an application running on a customer's smart phone may enable the customer to place an order for pizza. A mobile device may include a smart phone, a tablet computer, or some other type of computing device that may be portably used. The mobile application 712 may provide an interface for a customer to place an order. For example, the mobile application 712 may display on the mobile device an interface for the customer to order a pizza. The mobile application 712 may provide orders to an ordering backend

720. For example, the mobile application 712 may provide an order for a pizza through a network to the ordering backend 720.

The web application 714 may be an application accessible through a web browser running on a computing device, where the application enables a customer to place an order. For example, a Java application may be rendered by a web browser on a desktop computer and enable a customer to place an order for pizza. A computing device may include a mobile device, a desktop computer, a laptop computer, or some other type of device that computes. The web application 714 may provide an interface for a customer to place an order. For example, the web application 714 may display an interface, in a web browser on a desktop computer, for the customer to order a pizza. The web application 714 may provide orders to an ordering backend 720. For example, the web application 714 may provide an order for a pizza through a network to the ordering backend 720.

The text or SMS application 716 may be an application running on a mobile device that enables a customer to place an order by text or SMS. For example, an application running on a customer's smart phone may enable the customer to send a text or SMS message to the ordering backend 720 to place an order for pizza. In some implementations, the application may provide a graphical user interface for the user to select a particular item, particular location, and a particular time to receive the item, and generate a SMS message indicating the selections and provide the SMS message to the ordering backend 720.

The voice interface 718 may be an interface that enables a customer to place an order by voice. For example, the voice interface 718 may be a telephone that a customer may use to verbally order a pizza. The voice interface 718 may communicate with the call center workstations 722. For example, the voice interface 718 may transmit audio captured by the voice interface 718 to the call center workstations 722, and similarly, output audio from the call center workstations 722. The voice interface 718 may additionally or alternatively communicate with a local voice-based order taking component 732 of a local fulfillment center workstation 730. For example, the voice interface 718 may transmit audio captured by the voice interface 718 to the local voice-based order taking component 732, and similarly, output received audio from the local voice-based order taking component 732.

The ordering backend 720 may be a component that processes orders from customers. For example, the ordering backend may receive orders from the smart appliances 710, mobile application 712, web application 714, text or SMS application 716, the voice interface 718, or the call center workstations 722. The ordering backend 720 may process orders based on determining, for each order, one or more local fulfillment center workstations 730 to receive the order. For example, the ordering backend 720 may determine that a first order for a pizza should be provided to a first local fulfillment center workstation and a second order for a pizza should be provided to a different, second local fulfillment center workstation.

The ordering backend 720 may determine a local fulfillment center workstation to receive a particular order based on a location which the customer would like to obtain the item ordered. For example, the ordering backend 720 may determine that a first order indicates the order is to be obtained at a location where the distance from the location to the local fulfillment center is within a distance threshold, and in response, determine to provide the first order to a workstation of the local fulfillment center. In another example, the ordering backend 720 may determine that a second order is to be obtained at a location where the distance from the location to the local fulfillment center exceeds a distance threshold, and in response, determine the second order should be provided to a workstation of another local fulfillment center.

Additionally or alternatively, the ordering backend 720 may determine a local fulfillment center workstation to receive a particular order based on availability of the local fulfillment center to fulfill the order. For example, the ordering backend 720 may determine that a first order for a pizza can be fulfilled by a local fulfillment center as the local fulfillment center may still have capacity to provide the pizza. In another example, the ordering backend 720 may determine that a second order for a pizza cannot be fulfilled by a local fulfillment center as the local fulfillment center may not have capacity to provide the pizza.

In response to determining the local fulfillment center workstations 730 to receive an order, the ordering backend 720 may provide the order to the local fulfillment center workstations 730. For example, in response to determining that a local fulfillment center does deliver to the particular location requested by a customer and has capacity to fulfill an order for pizza, the ordering backend 720 may determine to provide the order for pizza to the local fulfillment center workstations 730 of the local fulfillment center.

In processing the orders, the ordering backend may also process payments for the orders. For example, the ordering backend 720 may validate whether payment information provided in the order is correct. In another example, the ordering backend 720 may place charges for orders using payment information provided in the order.

The ordering backend 720 may include a bulk order processor 724. The bulk order processor 724 may enable the ordering backend 720 to perform mass processing of orders. For example, the ordering backend 720 may receive an extremely large number of orders within a given time frame from the smart appliances 710, mobile application 712, web application 714, text or SMS application 716, the voice interface 718, or the call center workstations 722. Processing such an amount of orders may include determining, for each order, one or more local fulfillment center workstations out of thousands of potential local fulfillment center workstations 730 to receive the order.

The ordering backend 720 may also include a bulk order router 726. The bulk order router 726 may enable the ordering backend 720 to perform mass management of logistics, including delivery scheduling and collection scheduling of received orders. For example, the ordering backend may receive an extremely large number of orders within a given time frame from the smart appliances 710, mobile application 712, web application 714, text or SMS application 716, the voice interface 718, or the call center workstations 722. Managing the delivery scheduling or collection scheduling of such an amount of orders may include determining an order preparation schedule for each local fulfillment center workstation.

The ordering backend 720 performs a variety of tasks relating to processing or routing bulk orders, including sorting, assigning, routing, queuing, distributing and scheduling, to name a few. The study, optimization and execution of these tasks requires the uses of techniques and results from well-developed, active areas of scientific research, such as operational research, combinatorial optimization, graph theory (in particular network theory), queuing theory, and transport theory. Executing or providing optimal solutions to such tasks are proven to be complex and mathematically hard, particularly when considering large-scale systems. For example, e-commerce giant Amazon reported that they received, processed and delivered orders for 426 items per second in the run up to Christmas in 2013, see for example http://articles.latimes.com/2013/dec/26/business/la-fi-tn-amazon-sold-426-items-per-second-cyber-monday-20131226.

Since scaling is an extremely important factor, particularly in the context of e-commerce, tasks relating to processing or routing bulk orders quickly become extremely difficult, if not impossible, to solve and require powerful computers implementing complex algorithms and elegant mathematical programming techniques, as well as robust hardware architectures that can be parallelized. In some cases, it has even been shown that many tasks relating to the processing or routing of bulk orders are computationally intractable. In fact, the theory of computational complexity has introduced a concept of NP-hardness to classify such computationally intractable tasks.

For example, consider the intensely studied Traveling Salesman Problem (TSP), an NP-hard problem in combinatorial optimization. In its purest formulation, the TSP may be described as follows: given a list of cities and the distances between each pair of cities, what is the shortest route that visits each city exactly once, and returns to the original city. The TSP may also be modeled and described as a graph problem, wherein the cities are the graph's vertices and the distances between each pair of cities are the lengths of the graph's edges, or formulated as an integer linear program. The TSP has several applications in operational research, including planning and logistics, wherein the concept of a city may represent customers or orders, and the concept of a distance may represent travelling times or incurred costs. In some implementations, additional constraints may be imposed on the TSP, such as limiting an amount of resources or limiting to certain time windows. Finding increasingly efficient solutions to the TSP and other such complex, subtle operational research problems is an active area of scientific research, as evidenced by a plethora of technical textbooks, journals and scientific articles. See, for example "In Pursuit of the Travelling Salesman: Mathematics at the Limits of Computation," William Cook, Princeton University Press, 2011, "Dynamic programming strategies and reduction techniques for the traveling salesman problem with time windows and precedence constraints," L. Bianco, A. Mingozzi, and S. Ricciardelli, Operations Research, 45 (1997) 365-377 and "Scheduling vehicles from a central depot to a number of delivery points," G. Clarke and J. Wright, Operations Research 12 (1964) 568-581.

Another well-studied, fundamental combinatorial optimization problem in the field of operational research and optimization is the Assignment Problem (AP). In its most general form, the AP may be described as follows: given a number of agents, a number of tasks and a set of incurring costs for each potential agent-task assignment, perform all tasks by assigning one agent to each task, and one task to each agent, such that the total costs incurred is minimized. The AP also has several applications in areas such as planning and logistics. For example, the ordering backend 720 may interpret the task of processing received orders as an assignment problem, wherein a local fulfillment center workstation can be assigned to deliver an order, incurring some cost. The bulk order processor 724, for example, may require that all orders are delivered by assigning one local fulfillment center to each order, and one order to each local fulfillment center, in such a way that the total cost of the assignment is minimized. It has been shown that such an assignment problem can be expressed mathematically as a standard linear program, see, for example "Algorithms for the Assignment and Transportation Problems," James Munkres, Journal of the Society for Industrial and Applied Mathematics Vol. 5, No. 1 (March, 1957), pp. 32-38.

Linear programming has been shown to be an extremely powerful, essential optimization technique widely applied in various fields of study such as business studies and economics, as well as industrial areas such as engineering, transportation and manufacturing. The sophisticated mathematical programming techniques used in linear programming have proven essential to the modeling of diverse types of problems in routing, scheduling and assignment, and in turn have led to the creation of powerful computer systems that enable businesses to reduce costs, improve profitability, use resources effectively, reduce risks and provide untold benefits in many other key dimensions. Mathematically, linear programming is a technique for the optimization of a linear objective function, subject to linear equality and linear inequality constraints. While this requirement may seem overly restrictive, many real-world business problems can be formulated in this manner. Today, commercial linear-programming codes are able to solve linear programs with millions of constraints. For example, the commercial, high-performance mathematical programming solver IBM ILOG CPLEX of IBM is able to solve linear programs with the number of megabytes required for computation approximately equal to the number of constraints divided by 1000, see http://www-01.ibm.com/support/docview.wss?uid=swg21399933.

When dealing with large-scale systems, system components, such as the ordering backend 720, may employ techniques and results from Queuing Theory—the mathematical study of waiting lines, or queues—in order to model incoming customers or orders and subsequently make business decisions relating to order fulfillment, resource requirements for providing a certain service, expected waiting time in a queue, average time in a queue, expected queue length, expected number of customers in a queue at a given time, and the probability of a system to be in a certain state, such as empty or full. For example, it has been shown that most queues in restaurant operations can be described by an M/M/1 queue, where arrivals are determined by a Poisson process with heavy periods around lunch and dinner time, and service times have an exponential distribution. In a complex system of multiple M/M/1 queues, or a queue network, deep and sophisticated mathematical techniques such as stochastic calculus may be employed to model or approximate the queuing process. For example, in some implementations a heavy traffic approximation may be used to approximate a queuing process by a reflected Brownian motion, Ornstein-Uhlenbeck process or more general diffusion process. Since queues are basic components to both external and internal business processes, including scheduling and inventory management, understanding the nature of queues and learning how to manage them is one of the most important areas in operational research and management. See, for example, "A Methodology and Implementation for Analytic Modeling in Electronic Commerce Applications," H. Edwards, M. Bauer, H. Lutfiyya, Y. Chan, M. Shields and P. Woo, Electronic Commerce Technologies, Lecture notes in computer science, Volume 2040, 2001, pp 148-157 and "Stochastic Models in Queuing Theory", J. Medhi, Elsevier Academic Press, 2002.

The call center workstations 722 may receive voice input from the voice interface 718, generate orders based on the voice input, and provide the orders to the ordering backend

720. For example, the call center workstations 722 may audibly output voice input from the interface 718 to allow customer service representatives to verbally interact with customers, and generate orders for the customers. In some implementations, the call center workstations 722 may be automated and use speech recognition to generate orders for users. For example, the call center workstations 722 may execute an Artificial Intelligence customer service agent program that may verbally speak to the customer to take the order and place the order directly for the customer.

The local fulfillment center workstations 730 may receive orders from the ordering backend 720. For example, a particular local fulfillment center workstation may receive an order for pizza from the ordering backend 720. The local fulfillment center workstations may be located on the premises of the local fulfillment center and used by agents of the local fulfillment center. For example, a local fulfillment center workstation of a pizza provider may be located in a kitchen of the pizza provider and used by bakers to determine what pizzas to bake and when to bake the pizzas. In another example, local fulfillment center workstations of a pizza provider may be located in delivery vehicles of the pizza provider and used by pizza deliverers to determine where to deliver each pizza or a delivery route for the pizzas. The delivery route may be dynamically planned based on types of orders and locations to which the orders will be delivered. In yet another example, a local fulfillment center workstation may be used by a cashier of a pizza provider and used by the cashier to place additional orders for customers within the restaurant or determine whether a customer is the correct customer to receive a pizza that is ordered for pickup at the restaurant.

The local fulfillment center workstations 730 may provide information to agents of the local fulfillment center to fulfill orders. For example, a particular local fulfillment center workstation of a pizza provider may display an order number, a type of pizza ordered, a customer name for the order, a place of delivery for the order, and a time of delivery for the order. The local fulfillment center workstations 730 may obtain the information to provide agents of the local fulfillment center from the orders received from the ordering backend 720. For example, the orders received from the ordering backend 720 may include data that indicates an order number, a type of pizza ordered, a customer name for the order, a place of delivery for the order, and a time of delivery for the order. In some implementations, the local fulfillment center workstations 730 may prioritize the fulfillment of orders. For example, the local fulfillment center workstations 730 may prioritize the fulfillment of orders based on when the orders are to be provided to the users.

The local fulfillment center workstations 730 may include a local, voice-based order taking component 732. For example, the local fulfillment center workstations 730 may include a telephone-based system with which an employee of the local fulfillment center may speak to the customer. The local, voice-based order taking component 732 may enable customers to place orders directly with the local fulfillment center. For example, the same local fulfillment center workstations 730 that receive orders from the ordering backend 720 may also be used to generate orders based on input from customer service agents using the local fulfillment center workstations 730. In some implementations, the local, voice-based order taking component 732 may be automated and use speech recognition to generate orders for users.

The local fulfillment center workstations 730 may additionally or alternatively communicate with a supply chain or finance or enterprise component of a third party. For example, a local fulfillment center workstation may place an order for more flour with a supply chain component of a third party that sells flour for pizza. In another example, a local fulfillment center workstation may communicate with a finance component to place payment charges for orders.

The local fulfillment center workstations 730 may automatically determine to communicate with the supply chain or finance or enterprise component. For example, the local fulfillment center workstations 730 may automatically determine that the amount of flour in the inventory of the local fulfillment center is below a flour threshold, and in response, place an order for flour to the supply chain component of a pizza flour provider.

Figure 8:
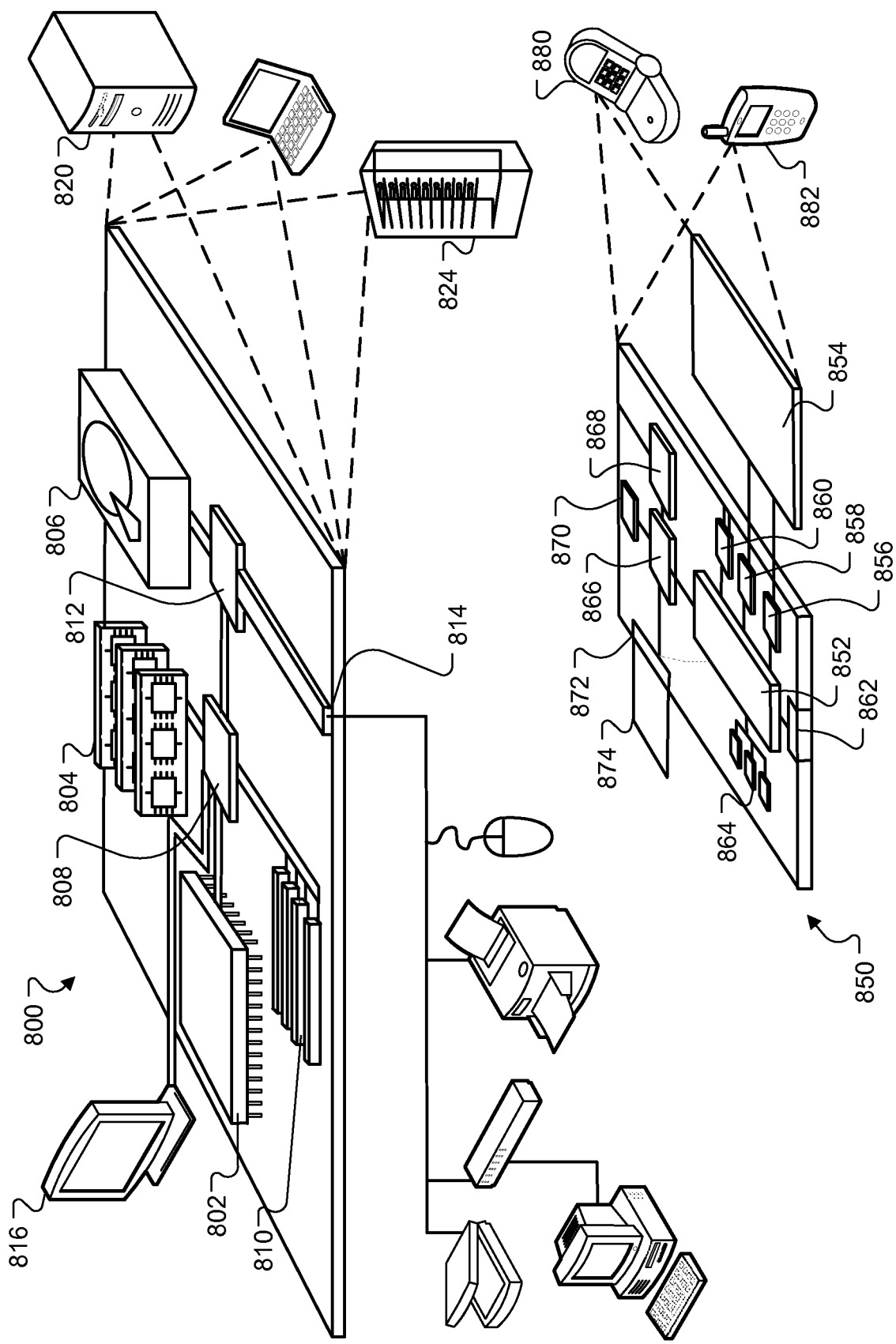
FIG. 8 illustrates an example of a computing device and a mobile computing device.

FIG. 8 shows an example of a computing device 800 and a mobile computing device 850 that can be used to implement the techniques described here. The computing device 800 is intended to represent various forms of digital computers, such as laptops, desktops, workstations, personal digital assistants, servers, blade servers, mainframes, and other appropriate computers. The mobile computing device 850 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 may also be another form of computer-readable medium, such as a magnetic or optical disk.

The storage device 806 is capable of providing mass storage for the computing device 800. In some implementations, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 802), perform one or more methods, such as those described above. The instructions can also be stored by one or more storage devices such as computer- or machine-readable mediums (for example, the memory 804, the storage device 806, or memory on the processor 802).

The high-speed interface 808 manages bandwidth-intensive operations for the computing device 800, while the low-speed interface 812 manages lower bandwidth-intensive operations. Such allocation of functions is an example only. In some implementations, the high-speed interface 808 is coupled to the memory 804, the display 816 (e.g., through a graphics processor or accelerator), and to the high-speed expansion ports 810, which may accept various expansion cards (not shown). In the implementation, the low-speed interface 812 is coupled to the storage device 806 and the low-speed expansion port 814. The low-speed expansion port 814, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. In addition, it may be implemented in a personal computer such as a laptop computer 822. It may also be implemented as part of a rack server system 824. Alternatively, components from the computing device 800 may be combined with other components in a mobile device (not shown), such as a mobile computing device 850. Each of such devices may contain one or more of the computing device 800 and the mobile computing device 850, and an entire system may be made up of multiple computing devices communicating with each other.

The mobile computing device 850 includes a processor 852, a memory 864, an input/output device such as a display 854, a communication interface 866, and a transceiver 868, among other components. The mobile computing device 850 may also be provided with a storage device, such as a micro-drive or other device, to provide additional storage. Each of the processor 852, the memory 864, the display 854, the communication interface 866, and the transceiver 868, are interconnected using various buses, and several of the components may be mounted on a common motherboard or in other manners as appropriate.

The processor 852 can execute instructions within the mobile computing device 850, including instructions stored in the memory 864. The processor 852 may be implemented as a chipset of chips that include separate and multiple analog and digital processors. The processor 852 may provide, for example, for coordination of the other components of the mobile computing device 850, such as control of user interfaces, applications run by the mobile computing device 850, and wireless communication by the mobile computing device 850.

The processor 852 may communicate with a user through a control interface 858 and a display interface 856 coupled to the display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may provide communication with the processor 852, so as to enable near area communication of the mobile computing device 850 with other devices. The external interface 862 may provide, for example, for wired communication in some implementations, or for wireless communication in other implementations, and multiple interfaces may also be used.

The memory 864 stores information within the mobile computing device 850. The memory 864 can be implemented as one or more of a computer-readable medium or media, a volatile memory unit or units, or a non-volatile memory unit or units. An expansion memory 874 may also be provided and connected to the mobile computing device 850 through an expansion interface 872, which may include, for example, a SIMM (Single In Line Memory Module) card interface. The expansion memory 874 may provide extra storage space for the mobile computing device 850, or may also store applications or other information for the mobile computing device 850. Specifically, the expansion memory 874 may include instructions to carry out or supplement the processes described above, and may include secure information also. Thus, for example, the expansion memory 874 may be provide as a security module for the mobile computing device 850, and may be programmed with instructions that permit secure use of the mobile computing device 850. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 852), perform one or more methods, such as those described above. The instructions can also be stored by one or more storage devices, such as one or more computer- or machine-readable mediums (for example, the memory 864, the expansion memory 874, or memory on the processor 852). In some implementations, the instructions can be received in a propagated signal, for example, over the transceiver 868 or the external interface 862.

The mobile computing device 850 may communicate wirelessly through the communication interface 866, which may include digital signal processing circuitry where necessary. The communication interface 866 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 868 using a radio-frequency. In addition, short-range communication may occur, such as using a Bluetooth, WiFi, or other such transceiver (not shown). In addition, a GPS (Global Positioning System) receiver module 870 may provide additional navigation- and location-related wireless data to the mobile computing device 850, which may be used as appropriate by applications running on the mobile computing device 850.

The mobile computing device 850 may also communicate audibly using an audio codec 860, which may receive spoken information from a user and convert it to usable digital information. The audio codec 860 may likewise generate audible sound for a user, such as through a speaker, e.g., in a handset of the mobile computing device 850. Such sound may include sound from voice telephone calls, may include recorded sound (e.g., voice messages, music files, etc.) and may also include sound generated by applications operating on the mobile computing device 850.

The mobile computing device 850 may be implemented in a number of different forms, as shown in the figure. For example, it may be implemented as a cellular telephone 880. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:

receiving, over a network, from one or more computers, and by an order detector of a backend order processing system that includes (a) the order detector, (b) an event correlator, (c) an order database manager, (d) an order/marketing manager, (e) a pattern detector, and (f) a user interface generator, (i) vendor data that specifies, for each vendor transaction, a vendor, goods sold, a total transaction price, and a transaction date and (ii) user data that specifies, for each user transaction, a vendor, a user identifier, and a transaction date;

based on the vendor data and the user data, determining, by the event correlator of the backend order processing system and for each vendor transaction, an order confidence score that corresponds to a likelihood that a particular user ordered a particular good from the vendor on a particular date by selecting a representation of the particular good from a default user interface that includes additional representations of other goods;

based on the order confidence scores, determining, by the order database manager of the backend order processing system, for each user, for each good, and for each vendor, a composite confidence score that reflects a likelihood that the user ordered the good from the vendor by selecting a representation of the good from the default user interface;

storing, by the order database manager of the backend order processing system, the composite confidence scores that each reflect the likelihood that the respective user ordered the respective good from the respective vendor;

based on the composite confidence scores that each reflect the likelihood that the respective user ordered the respective good from the respective vendor, generating, by the order/marketing manager of the backend order processing system and for each respective user, a rule for adjusting the default user interface, the rule specifying to promote goods that the respective user is less likely to select than other goods;

receiving, by the pattern detector of the backend order processing system, data indicating that a given user is accessing a goods ordering application for a given vendor, the good ordering application being configured to present a default user interface that includes goods offered by the given vendor;

in response to the data indicating that the given user is accessing the goods ordering application for the given vendor and based on the rule specifying to promote goods that the given user is less likely to select than other goods, adjusting, by the user interface generator of the backend order processing system, the default user interface for the goods ordering application by automatically moving representations of goods that the given user is less likely to select than other goods to more prominent positions in the default user interface; and providing, by the user interface generator of the backend order processing system and for output in the goods ordering application for the given vendor, the adjusted user interface.

2. The method of claim 1, wherein adjusting the default user interface for the goods ordering application by automatically moving representations of goods that the given user is less likely to select than other goods to more prominent positions in the default user interface comprises:
based on the rule for adjusting the default user interface, adjusting the default user interface for the good ordering application by moving the representations of goods that the given user is less likely to select to a top of the default user interface.

3. The method of claim 1, wherein each rule is configured to increase a total transaction price.

4. The method of claim 1, wherein adjusting the default user interface for the goods ordering application by automatically moving representations of goods that the given user is less likely to select than other goods to more prominent positions in the default user interface comprises:
based on the rule for adjusting the default user interface, adjusting the default user interface for the good ordering application by decreasing prices of goods that the given user is less likely to purchase.

5. The method of claim 1, wherein:
each composite confidence score reflects a likelihood that the user ordered the good from the vendor on a particular day, and
the rule for adjusting the default user interface specifies to promote goods that the respective user is less likely to purchase than other goods on a particular future day.

6. The method of claim 1, wherein receiving the user data that specifies, for each user transaction, a vendor, a user identifier, and a transaction date comprises accessing, by a social medial crawler of the backend order processing system, social media posts and reviews that indicate a purchase from the vendor and a corresponding user identifier.

7. The method of claim 1, wherein determining, for each user, for each good, and for each vendor, a composite confidence score that reflects a likelihood that the user ordered the good from the vendor comprises identifying patterns among the vendor data and the user data according to the order confidence scores.

8. A system comprising:
one or more computers and one or more storage devices storing instructions that are operable, when executed by the one or more computers, to cause the one or more computers to perform operations comprising:
receiving, over a network, from one or more computers, and by an order detector of a backend order processing system that includes (a) the order detector, (b) an event correlator, (c) an order database manager, (d) an order/marketing manager, (e) a pattern detector, and (f) a user interface generator, (i) vendor data that specifies, for each vendor transaction, a vendor, goods sold, a total transaction price, and a transaction date and (ii) user data that specifies, for each user transaction, a vendor, a user identifier, and a transaction date;

based on the vendor data and the user data, determining, by the event correlator of the backend order processing system and for each vendor transaction, an order confidence score that corresponds to a likelihood that a particular user ordered a particular good from the vendor on a particular date by selecting a representation of the particular good from a default user interface that includes additional representations of other goods;

based on the order confidence scores, determining, by the order database manager of the backend order processing system, for each user, for each good, and for each vendor, a composite confidence score that reflects a likelihood that the user ordered the good from the vendor by selecting a representation of the good from the default user interface;

storing, by the order database manager of the backend order processing system, the composite confidence scores that each reflect the likelihood that the respective user ordered the respective good from the respective vendor;

based on the composite confidence scores that each reflect the likelihood that the respective user ordered the respective good from the respective vendor, generating, by the order/marketing manager of the backend order processing system and for each respective user, a rule for adjusting the default user interface, the rule specifying to promote goods that the respective user is less likely to select than other goods;

receiving, by the pattern detector of the backend order processing system, data indicating that a given user is accessing a goods ordering application for a given vendor, the good ordering application being configured to present a default user interface that includes goods offered by the given vendor;

in response to the data indicating that the given user is accessing the goods ordering application for the given vendor and based on the rule specifying to promote goods that the given user is less likely to select than other goods, adjusting, by the user interface generator of the backend order processing system, the default user interface for the goods ordering application by automatically moving representations of goods that the given user is less likely to select than other goods to more prominent positions in the default user interface; and providing, by the user interface generator of the backend order processing system and for output in the goods ordering application for the given vendor, the adjusted user interface.

9. The system of claim 8, wherein adjusting the default user interface for the goods ordering application by automatically moving representations of goods that the given user is less likely to select than other goods to more prominent positions in the default user interface comprises:
based on the rule for adjusting the default user interface, adjusting the default user interface for the good ordering application by moving the representations of goods that the given user is less likely to select to a top of the default user interface.

10. The system of claim 8, wherein each rule is configured to increase a total transaction price.

11. The system of claim 8, wherein adjusting the default user interface for the goods ordering application by automatically moving representations of goods that the given user is less likely to select than other goods to more prominent positions in the default user interface comprises:
based on the rule for adjusting the default user interface, adjusting the default user interface for the good ordering application by decreasing prices of goods that the given user is less likely to purchase.

12. The system of claim 8, wherein:
each composite confidence score reflects a likelihood that the user ordered the good from the vendor on a particular day, and
the rule for adjusting the default user interface specifies to promote goods that the respective user is less likely to purchase than other goods on a particular future day.

13. The system of claim 8, wherein receiving the user data that specifies, for each user transaction, a vendor, a user identifier, and a transaction date comprises accessing, by a social medial crawler of the backend order processing system, social media posts and reviews that indicate a purchase from the vendor and a corresponding user identifier.

14. The system of claim 8, wherein determining, for each user, for each good, and for each vendor a composite confidence score that reflects a likelihood that the user ordered the good from the vendor comprises identifying patterns among the vendor data and the user data according to the order confidence scores.

15. A non-transitory computer-readable medium storing software comprising instructions executable by one or more computers which, upon such execution, cause the one or more computers to perform operations comprising:
receiving, over a network, from one or more computers, and by an order detector of a backend order processing system that includes (a) the order detector, (b) an event correlator, (c) an order database manager, (d) an order/marketing manager, (e) a pattern detector, and (f) a user interface generator, (i) vendor data that specifies, for each vendor transaction, a vendor, goods sold, a total transaction price, and a transaction date and (ii) user data that specifies, for each user transaction, a vendor, a user identifier, and a transaction date;
based on the vendor data and the user data, determining, by the event correlator of the backend order processing system and for each vendor transaction, an order confidence score that corresponds to a likelihood that a particular user ordered a particular good from the vendor on a particular date by selecting a representation of the particular good from a default user interface that includes additional representations of other goods;
based on the order confidence scores, determining, by the order database manager of the backend order processing system, for each user, for each good, and for each vendor, a composite confidence score that reflects a likelihood that the user ordered the good from the vendor by selecting a representation of the good from the default user interface;
storing, by the order database manager of the backend order processing system, the composite confidence scores that each reflect the likelihood that the respective user ordered the respective good from the respective vendor;
based on the composite confidence scores that each reflect the likelihood that the respective user ordered the respective good from the respective vendor, generating, by the order/marketing manager of the backend order processing system and for each respective user, a rule for adjusting the default user interface, the rule specifying to promote goods that the respective user is less likely to select than other goods;
receiving, by the pattern detector of the backend order processing system, data indicating that a given user is accessing a goods ordering application for a given vendor, the good ordering application being configured to present a default user interface that includes goods offered by the given vendor;
in response to the data indicating that the given user is accessing the goods ordering application for the given vendor and based on the rule specifying to promote goods that the given user is less likely to select than other goods, adjusting, by the user interface generator of the backend order processing system, the default user interface for the goods ordering application by automatically moving representations of goods that the given user is less likely to select than other goods to more prominent positions in the default user interface; and
providing, by the user interface generator of the backend order processing system and for output in the goods ordering application for the given vendor, the adjusted user interface.

16. The medium of claim 15, wherein adjusting the default user interface for the goods ordering application by automatically moving representations of goods that the given user is less likely to select than other goods to more prominent positions in the default user interface comprises:
based on the rule for adjusting the default user interface, adjusting the default user interface for the good ordering application by moving the representations of goods that the given user is less likely to select to a top of the default user interface.

17. The medium of claim 15, wherein each rule is configured to increase a total transaction price.

18. The medium of claim 15, wherein adjusting the default user interface for the goods ordering application by automatically moving representations of goods that the given user is less likely to select than other goods to more prominent positions in the default user interface comprises:
based on the rule for adjusting the default user interface, adjusting the default user interface for the good ordering application by decreasing prices of goods that the given user is less likely to purchase.

19. The medium of claim 15, wherein:
each composite confidence score reflects a likelihood that the user ordered the good from the vendor on a particular day, and
the rule for adjusting the default user interface specifies to promote goods that the respective user is less likely to purchase than other goods on a particular future day.

20. The medium of claim 15, wherein receiving the user data that specifies, for each user transaction, a vendor, a user identifier, and a transaction date comprises accessing, by a social medial crawler of the backend order processing system, social media posts and reviews that indicate a purchase from the vendor and a corresponding user identifier.

21. The method of claim 1, wherein:
receiving the vendor data that specifies, for each vendor transaction, a vendor, goods sold, a total transaction price, and a transaction date comprises:
receiving, from vendor computing devices, the vendor data that specifies, for each vendor transaction, a vendor, goods sold, a total transaction price, and a transaction date, and receiving the user data that specifies, for each user transaction, a vendor, a user identifier, and a transaction date comprises:
   receiving, from user computing devices, the user data that specifies, for each user transaction, a vendor, a user identifier, and a transaction date.

\* \* \* \* \*